(12) United States Patent
McAlister

(10) Patent No.: US 9,051,909 B2
(45) Date of Patent: ***Jun. 9, 2015

(54) MULTIFUEL STORAGE, METERING AND IGNITION SYSTEM

(71) Applicant: McAlister Technologies, LLC, Phoenix, AZ (US)

(72) Inventor: Roy Edward McAlister, Phoenix, AZ (US)

(73) Assignee: McAlister Technologies, LLC, Phoenix, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/664,369

(22) Filed: Oct. 30, 2012

(65) Prior Publication Data

US 2013/0276746 A1    Oct. 24, 2013

Related U.S. Application Data

(60) Continuation of application No. 12/581,825, filed on Oct. 19, 2009, now Pat. No. 8,297,254, which is a division of application No. 12/006,774, filed on Jan. 7, 2008, now Pat. No. 7,628,137.

(51) Int. Cl.
*F02M 57/06* (2006.01)
*F02M 51/06* (2006.01)
(Continued)

(52) U.S. Cl.
CPC ......... *F02M 57/06* (2013.01); *F02B 2075/125* (2013.01); *F02M 51/0671* (2013.01); *H01M 8/04089* (2013.01); *H01M 8/04186* (2013.01); *Y02T 10/123* (2013.01); *Y02T 10/32* (2013.01); *F02M 21/0275* (2013.01); *Y02E 10/725* (2013.01); *F02M 21/0206* (2013.01); *F02M 21/0215* (2013.01); *F02M 21/0221* (2013.01); *F02M 21/0245* (2013.01);
(Continued)

(58) Field of Classification Search
USPC .......... 123/467, 472, 297, 304, 295; 239/533.13, 533.14
See application file for complete search history.

(56) References Cited

U.S. PATENT DOCUMENTS

| | | |
|---|---|---|
| 1,307,088 A | 6/1919 | Drummond |
| 1,451,384 A | 4/1923 | Whyte |

(Continued)

FOREIGN PATENT DOCUMENTS

| | | |
|---|---|---|
| CN | 1411535 A | 4/2003 |
| DE | 3443022 A1 | 5/1986 |

(Continued)

OTHER PUBLICATIONS

"Ford DIS/EDIS "Waste Spark" Ignition System." Accessed: Jul. 15, 2010. Printed: Jun. 8, 2011. <http://rockledge.home.comcast.net/~rockledge/RangerPictureGallery/DIS_EDIS.htm>. pp. 1-6.

(Continued)

*Primary Examiner* — Erick Solis
*Assistant Examiner* — Anthony L Bacon
(74) *Attorney, Agent, or Firm* — Loeb & Loeb LLP

(57) ABSTRACT

A system for safe storage and efficient utilization of a variety of fuel selections that range in composition and phase from cryogenic mixtures of solids and liquids to elevated temperature gases is provided for unique applications with various types of heat engines and fuel cells including hybridized combinations.

19 Claims, 7 Drawing Sheets

(51) Int. Cl.
*F02M 21/02* (2006.01)
*F02B 75/12* (2006.01)
*H01M 8/04* (2006.01)

(52) U.S. Cl.
CPC ...... *F02M 21/0287* (2013.01); *F02M 21/0296* (2013.01); *F02M 21/026* (2013.01)

(56) References Cited

U.S. PATENT DOCUMENTS

| | | |
|---|---|---|
| 2,255,203 A | 9/1941 | Wiegand |
| 2,864,974 A | 12/1958 | Beye |
| 3,058,453 A | 10/1962 | May |
| 3,060,912 A | 10/1962 | May |
| 3,081,758 A | 3/1963 | May |
| 3,149,620 A | 9/1964 | Cataldo |
| 3,243,335 A | 3/1966 | Faile |
| 3,286,164 A | 11/1966 | De Huff |
| 3,361,161 A * | 1/1968 | Schwartz ............... 261/53 |
| 3,373,724 A | 3/1968 | Papst |
| 3,520,961 A | 7/1970 | Suda et al. |
| 3,551,738 A | 12/1970 | Young |
| 3,594,877 A | 7/1971 | Suda et al. |
| 3,608,050 A | 9/1971 | Carman et al. |
| 3,689,293 A | 9/1972 | Beall |
| 3,762,170 A * | 10/1973 | Fitzhugh ............... 405/38 |
| 3,802,194 A | 4/1974 | Tanasawa et al. |
| 3,926,169 A * | 12/1975 | Leshner et al. ............... 123/297 |
| 3,931,438 A | 1/1976 | Beall et al. |
| 3,960,995 A | 6/1976 | Kourkene |
| 3,976,039 A | 8/1976 | Henault |
| 3,997,352 A | 12/1976 | Beall |
| 4,066,046 A | 1/1978 | McAlister |
| 4,095,580 A | 6/1978 | Murray et al. |
| 4,099,494 A * | 7/1978 | Goloff et al. ............... 123/445 |
| 4,105,004 A | 8/1978 | Asai et al. |
| 4,122,816 A | 10/1978 | Fitzgerald et al. |
| 4,135,481 A | 1/1979 | Resler, Jr. |
| 4,183,467 A | 1/1980 | Sheraton et al. |
| 4,203,393 A | 5/1980 | Giardini |
| 4,281,797 A | 8/1981 | Kimata et al. |
| 4,313,412 A | 2/1982 | Hosaka et al. |
| 4,330,732 A | 5/1982 | Lowther |
| 4,332,223 A | 6/1982 | Dalton |
| 4,364,342 A | 12/1982 | Asik |
| 4,364,363 A | 12/1982 | Miyagi et al. |
| 4,368,707 A | 1/1983 | Leshner et al. |
| 4,377,455 A | 3/1983 | Kadija et al. |
| 4,402,036 A | 8/1983 | Hensley et al. |
| 4,469,160 A | 9/1984 | Giamei |
| 4,483,485 A | 11/1984 | Kamiya et al. |
| 4,514,712 A | 4/1985 | McDougal |
| 4,528,270 A | 7/1985 | Matsunaga |
| 4,531,679 A * | 7/1985 | Pagdin ............... 239/585.1 |
| 4,536,452 A | 8/1985 | Stempin et al. |
| 4,567,857 A | 2/1986 | Houseman et al. |
| 4,574,037 A | 3/1986 | Samejima et al. |
| 4,677,960 A | 7/1987 | Ward |
| 4,684,211 A | 8/1987 | Weber et al. |
| 4,688,538 A | 8/1987 | Ward et al. |
| 4,716,874 A | 1/1988 | Hilliard et al. |
| 4,733,646 A | 3/1988 | Iwasaki |
| 4,736,718 A | 4/1988 | Linder |
| 4,742,265 A | 5/1988 | Giachino et al. |
| 4,760,818 A | 8/1988 | Brooks et al. |
| 4,760,820 A | 8/1988 | Tozzi |
| 4,830,286 A * | 5/1989 | Asslaender et al. ....... 239/585.3 |
| 4,982,708 A | 1/1991 | Stutzenberger |
| 5,034,852 A | 7/1991 | Rosenberg |
| 5,035,360 A | 7/1991 | Green et al. |
| 5,036,669 A | 8/1991 | Earleson et al. |
| 5,055,435 A | 10/1991 | Hamanaka et al. |
| 5,056,496 A | 10/1991 | Morino et al. |
| 5,076,223 A | 12/1991 | Harden et al. |
| 5,095,742 A | 3/1992 | James et al. |
| 5,109,817 A | 5/1992 | Cherry |
| 5,131,376 A | 7/1992 | Ward et al. |
| 5,134,982 A | 8/1992 | Hosoi |
| 5,150,682 A | 9/1992 | Magnet |
| 5,193,515 A | 3/1993 | Oota et al. |
| 5,207,208 A | 5/1993 | Ward |
| 5,211,142 A | 5/1993 | Matthews et al. |
| 5,220,901 A | 6/1993 | Morita et al. |
| 5,222,481 A | 6/1993 | Morikawa |
| 5,267,601 A | 12/1993 | Dwivedi |
| 5,297,518 A | 3/1994 | Cherry |
| 5,305,360 A | 4/1994 | Remark et al. |
| 5,328,094 A | 7/1994 | Goetzke et al. |
| 5,329,606 A | 7/1994 | Andreassen |
| 5,343,699 A | 9/1994 | McAlister |
| 5,361,737 A | 11/1994 | Smith et al. |
| 5,377,633 A | 1/1995 | Wakeman |
| 5,392,745 A | 2/1995 | Beck |
| 5,394,852 A | 3/1995 | McAlister |
| 5,421,299 A | 6/1995 | Cherry |
| 5,435,286 A | 7/1995 | Carroll, III et al. |
| 5,439,532 A | 8/1995 | Fraas |
| 5,456,241 A | 10/1995 | Ward |
| 5,473,502 A | 12/1995 | Bonavia et al. |
| 5,475,772 A | 12/1995 | Hung et al. |
| 5,497,744 A | 3/1996 | Nagaosa et al. |
| 5,517,961 A | 5/1996 | Ward |
| 5,531,199 A | 7/1996 | Bryant et al. |
| 5,534,781 A | 7/1996 | Lee et al. |
| 5,549,746 A | 8/1996 | Scott et al. |
| 5,568,801 A | 10/1996 | Paterson et al. |
| 5,584,490 A | 12/1996 | Inoue et al. |
| 5,588,299 A | 12/1996 | DeFreitas |
| 5,598,699 A | 2/1997 | Few et al. |
| 5,605,125 A | 2/1997 | Yaoita |
| 5,607,106 A | 3/1997 | Bentz et al. |
| 5,608,832 A | 3/1997 | Pfandl et al. |
| 5,649,507 A | 7/1997 | Gregoire et al. |
| 5,715,788 A | 2/1998 | Tarr et al. |
| 5,738,818 A | 4/1998 | Atmur et al. |
| 5,745,615 A | 4/1998 | Atkins et al. |
| 5,746,171 A | 5/1998 | Yaoita |
| 5,767,026 A | 6/1998 | Kondoh et al. |
| 5,769,049 A | 6/1998 | Nytomt et al. |
| 5,797,427 A | 8/1998 | Buescher |
| 5,806,581 A | 9/1998 | Haasch et al. |
| 5,816,217 A | 10/1998 | Wong |
| 5,832,906 A | 11/1998 | Douville et al. |
| 5,853,175 A | 12/1998 | Udagawa |
| 5,863,326 A | 1/1999 | Nause et al. |
| 5,876,659 A | 3/1999 | Yasutomi et al. |
| 5,896,842 A | 4/1999 | Abusamra |
| 5,915,272 A | 6/1999 | Foley et al. |
| 5,930,420 A | 7/1999 | Atkins et al. |
| 5,941,207 A | 8/1999 | Anderson et al. |
| 6,015,065 A | 1/2000 | McAlister |
| 6,017,390 A | 1/2000 | Charych et al. |
| 6,026,568 A | 2/2000 | Atmur et al. |
| 6,029,627 A | 2/2000 | VanDyne |
| 6,029,640 A | 2/2000 | Bengtsson et al. |
| 6,062,498 A | 5/2000 | Klopfer |
| 6,085,990 A | 7/2000 | Augustin |
| 6,092,501 A | 7/2000 | Matayoshi et al. |
| 6,092,507 A | 7/2000 | Bauer et al. |
| 6,093,338 A | 7/2000 | Tani et al. |
| 6,102,303 A | 8/2000 | Bright et al. |
| 6,138,639 A | 10/2000 | Hiraya et al. |
| 6,173,913 B1 | 1/2001 | Shafer et al. |
| 6,185,355 B1 | 2/2001 | Hung |
| 6,189,522 B1 | 2/2001 | Moriya |
| 6,253,728 B1 | 7/2001 | Matayoshi et al. |
| 6,267,307 B1 | 7/2001 | Pontoppidan |
| 6,281,976 B1 | 8/2001 | Taylor et al. |
| 6,335,065 B1 | 1/2002 | Steinlage et al. |
| 6,340,015 B1 | 1/2002 | Benedikt et al. |
| 6,360,721 B1 | 3/2002 | Schuricht et al. |
| 6,360,730 B1 | 3/2002 | Koethe |
| 6,378,485 B2 | 4/2002 | Elliott |
| 6,386,178 B1 | 5/2002 | Rauch |

(56) References Cited

U.S. PATENT DOCUMENTS

| | | | |
|---|---|---|---|
| 6,443,373 B1 * | 9/2002 | Portugues | 239/533.13 |
| 6,446,597 B1 | 9/2002 | McAlister | |
| 6,453,660 B1 | 9/2002 | Johnson et al. | |
| 6,455,173 B1 | 9/2002 | Marijnissen et al. | |
| 6,478,007 B2 | 11/2002 | Miyashita et al. | |
| 6,483,311 B1 | 11/2002 | Ketterer et al. | |
| 6,490,391 B1 | 12/2002 | Zhao et al. | |
| 6,501,875 B2 | 12/2002 | Zhao et al. | |
| 6,503,584 B1 | 1/2003 | McAlister | |
| 6,506,336 B1 | 1/2003 | Beall et al. | |
| 6,516,114 B2 | 2/2003 | Zhao et al. | |
| 6,517,011 B1 | 2/2003 | Ayanji et al. | |
| 6,532,315 B1 | 3/2003 | Hung et al. | |
| 6,542,663 B1 | 4/2003 | Zhao et al. | |
| 6,543,700 B2 | 4/2003 | Jameson et al. | |
| 6,549,713 B1 | 4/2003 | Pi et al. | |
| 6,556,746 B1 | 4/2003 | Zhao et al. | |
| 6,567,599 B2 | 5/2003 | Hung | |
| 6,571,035 B1 | 5/2003 | Pi et al. | |
| 6,578,775 B2 | 6/2003 | Hokao | |
| 6,583,901 B1 | 6/2003 | Hung | |
| 6,584,244 B2 | 6/2003 | Hung | |
| 6,587,239 B1 | 7/2003 | Hung | |
| 6,599,028 B1 | 7/2003 | Shu et al. | |
| 6,615,899 B1 | 9/2003 | Woodward et al. | |
| 6,621,964 B2 | 9/2003 | Quinn et al. | |
| 6,626,164 B2 | 9/2003 | Hitomi et al. | |
| 6,663,027 B2 | 12/2003 | Jameson et al. | |
| 6,668,630 B1 | 12/2003 | Kuglin et al. | |
| 6,672,277 B2 | 1/2004 | Yasuoka et al. | |
| 6,700,306 B2 | 3/2004 | Nakamura et al. | |
| 6,705,274 B2 | 3/2004 | Kubo | |
| 6,722,340 B1 | 4/2004 | Sukegawa et al. | |
| 6,725,826 B2 | 4/2004 | Esteghlal | |
| 6,742,499 B2 | 6/2004 | Viele et al. | |
| 6,745,744 B2 | 6/2004 | Suckewer et al. | |
| 6,756,140 B1 | 6/2004 | McAlister | |
| 6,763,811 B1 | 7/2004 | Tamol, Sr. | |
| 6,772,965 B2 * | 8/2004 | Yildirim et al. | 239/533.3 |
| 6,776,352 B2 | 8/2004 | Jameson | |
| 6,779,513 B2 | 8/2004 | Pellizzari et al. | |
| 6,786,200 B2 | 9/2004 | Viele et al. | |
| 6,832,472 B2 | 12/2004 | Huang et al. | |
| 6,832,588 B2 | 12/2004 | Herden et al. | |
| 6,841,309 B1 * | 1/2005 | Alpay et al. | 430/5 |
| 6,845,920 B2 | 1/2005 | Sato et al. | |
| 6,850,069 B2 | 2/2005 | McQueeney et al. | |
| 6,851,413 B1 | 2/2005 | Tamol, Sr. | |
| 6,854,438 B2 | 2/2005 | Hilger et al. | |
| 6,871,630 B2 | 3/2005 | Herden et al. | |
| 6,883,490 B2 | 4/2005 | Jayne | |
| 6,883,507 B2 | 4/2005 | Freen | |
| 6,898,355 B2 | 5/2005 | Johnson et al. | |
| 6,899,076 B2 | 5/2005 | Funaki et al. | |
| 6,904,893 B2 | 6/2005 | Hotta et al. | |
| 6,912,998 B1 | 7/2005 | Rauznitz et al. | |
| 6,925,983 B2 | 8/2005 | Herden et al. | |
| 6,935,310 B2 | 8/2005 | Viele et al. | |
| 6,940,213 B1 | 9/2005 | Heinz et al. | |
| 6,954,074 B2 | 10/2005 | Zhu et al. | |
| 6,976,683 B2 | 12/2005 | Eckert et al. | |
| 6,978,767 B2 | 12/2005 | Bonutti | |
| 6,984,305 B2 | 1/2006 | McAlister | |
| 6,993,960 B2 | 2/2006 | Benson | |
| 6,994,073 B2 | 2/2006 | Tozzi et al. | |
| 7,007,658 B1 | 3/2006 | Cherry et al. | |
| 7,013,863 B2 | 3/2006 | Shiraishi et al. | |
| 7,025,358 B2 | 4/2006 | Ueta et al. | |
| 7,032,845 B2 | 4/2006 | Dantes et al. | |
| 7,070,126 B2 | 7/2006 | Shinogle | |
| 7,073,480 B2 | 7/2006 | Shiraishi et al. | |
| 7,086,376 B2 | 8/2006 | McKay | |
| 7,104,246 B1 | 9/2006 | Gagliano et al. | |
| 7,104,250 B1 | 9/2006 | Yi et al. | |
| 7,121,253 B2 | 10/2006 | Shiraishi et al. | |
| 7,124,964 B2 * | 10/2006 | Bui | 239/519 |
| 7,131,426 B2 | 11/2006 | Ichinose et al. | |
| 7,137,382 B2 | 11/2006 | Zhu et al. | |
| 7,138,046 B2 | 11/2006 | Roychowdhury | |
| 7,140,347 B2 | 11/2006 | Suzuki et al. | |
| 7,198,208 B2 | 4/2007 | Dye et al. | |
| 7,204,133 B2 | 4/2007 | Benson et al. | |
| 7,214,883 B2 | 5/2007 | Leyendecker | |
| 7,249,578 B2 | 7/2007 | Fricke et al. | |
| 7,255,290 B2 | 8/2007 | Bright et al. | |
| 7,272,487 B2 | 9/2007 | Christen et al. | |
| 7,278,392 B2 | 10/2007 | Zillmer et al. | |
| 7,284,543 B2 | 10/2007 | Kato et al. | |
| 7,302,792 B2 | 12/2007 | Land, III et al. | |
| 7,305,971 B2 | 12/2007 | Fujii | |
| 7,308,889 B2 | 12/2007 | Post et al. | |
| 7,386,982 B2 | 6/2008 | Runkle et al. | |
| 7,395,146 B2 | 7/2008 | Ueda et al. | |
| 7,404,395 B2 | 7/2008 | Yoshimoto | |
| 7,418,940 B1 | 9/2008 | Yi et al. | |
| 7,481,043 B2 | 1/2009 | Hirata et al. | |
| 7,484,369 B2 | 2/2009 | Myhre | |
| 7,554,250 B2 | 6/2009 | Kadotani et al. | |
| 7,625,531 B1 | 12/2009 | Coates et al. | |
| 7,626,315 B2 | 12/2009 | Nagase | |
| 7,627,416 B2 | 12/2009 | Batenburg et al. | |
| 7,628,137 B1 | 12/2009 | McAlister | |
| 7,628,145 B2 | 12/2009 | Ishibashi et al. | |
| 7,650,873 B2 | 1/2010 | Hofbauer et al. | |
| 7,690,352 B2 | 4/2010 | Zhu et al. | |
| 7,703,775 B2 | 4/2010 | Matsushita et al. | |
| 7,707,832 B2 | 5/2010 | Commaret et al. | |
| 7,714,483 B2 | 5/2010 | Hess et al. | |
| 7,721,697 B2 | 5/2010 | Smith et al. | |
| 7,728,489 B2 | 6/2010 | Heinz et al. | |
| 7,849,833 B2 | 12/2010 | Toyoda | |
| 7,900,850 B2 * | 3/2011 | Zengerle et al. | 239/11 |
| 7,918,212 B2 | 4/2011 | Verdejo et al. | |
| 7,938,102 B2 | 5/2011 | Sherry | |
| 8,069,836 B2 | 12/2011 | Ehresman | |
| 8,091,536 B2 | 1/2012 | Munshi et al. | |
| 8,132,560 B2 | 3/2012 | Ulrey et al. | |
| 8,147,599 B2 | 4/2012 | McAlister | |
| 8,192,852 B2 | 6/2012 | McAlister | |
| 8,267,063 B2 | 9/2012 | McAlister | |
| 8,297,254 B2 | 10/2012 | McAlister | |
| 8,311,723 B2 | 11/2012 | McAlister | |
| 8,312,759 B2 | 11/2012 | McAlister | |
| 8,371,273 B2 | 2/2013 | Ulrey et al. | |
| 8,416,552 B2 | 4/2013 | Gefter et al. | |
| 8,441,361 B2 | 5/2013 | McAlister | |
| 8,469,009 B2 | 6/2013 | Munshi et al. | |
| 8,511,259 B2 | 8/2013 | Ambrosini et al. | |
| 8,538,663 B2 | 9/2013 | Jung et al. | |
| 8,578,902 B2 | 11/2013 | Permuy et al. | |
| 2002/0017573 A1 | 2/2002 | Sturman | |
| 2002/0070287 A1 | 6/2002 | Jameson | |
| 2002/0084793 A1 | 7/2002 | Hung et al. | |
| 2002/0131171 A1 | 9/2002 | Hung | |
| 2002/0131666 A1 | 9/2002 | Hung et al. | |
| 2002/0131673 A1 | 9/2002 | Hung | |
| 2002/0131674 A1 | 9/2002 | Hung | |
| 2002/0131706 A1 | 9/2002 | Hung | |
| 2002/0131756 A1 | 9/2002 | Hung | |
| 2002/0141692 A1 | 10/2002 | Hung | |
| 2002/0150375 A1 | 10/2002 | Hung et al. | |
| 2002/0151113 A1 | 10/2002 | Hung et al. | |
| 2003/0012985 A1 | 1/2003 | McAlister | |
| 2004/0008989 A1 | 1/2004 | Hung | |
| 2004/0084017 A1 | 5/2004 | Viele et al. | |
| 2004/0084026 A1 | 5/2004 | Zhu et al. | |
| 2004/0187847 A1 | 9/2004 | Viele et al. | |
| 2005/0126537 A1 | 6/2005 | Daniels et al. | |
| 2005/0255011 A1 | 11/2005 | Greathouse et al. | |
| 2005/0257776 A1 | 11/2005 | Bonutti | |
| 2006/0016916 A1 | 1/2006 | Petrone et al. | |
| 2006/0169244 A1 | 8/2006 | Allen | |
| 2007/0186903 A1 | 8/2007 | Zhu et al. | |
| 2007/0189114 A1 | 8/2007 | Reiner et al. | |

(56) References Cited

U.S. PATENT DOCUMENTS

| | | |
|---|---|---|
| 2008/0017170 A1 | 1/2008 | Moroi et al. |
| 2010/0108023 A1 | 5/2010 | McAlister |
| 2011/0048374 A1 | 3/2011 | McAlister |
| 2011/0146619 A1 | 6/2011 | McAlister |
| 2011/0210182 A1 | 9/2011 | McAlister |
| 2012/0180743 A1 | 7/2012 | Burrows et al. |
| 2013/0149621 A1 | 6/2013 | McAlister |

FOREIGN PATENT DOCUMENTS

| | | |
|---|---|---|
| DE | 19731329 C1 | 6/1998 |
| DE | 10356133 A1 | 7/2005 |
| DE | 102005060139 A1 | 6/2007 |
| DE | 102006021192 A1 | 11/2007 |
| EP | 671555 A1 | 9/1995 |
| GB | 1038490 A | 8/1966 |
| JP | 02-259268 A | 10/1990 |
| JP | 08-049623 A | 2/1996 |
| JP | 2004-324613 A | 11/2007 |

OTHER PUBLICATIONS

"P dV's Custom Data Acquisition Systems Capabilities." PdV Consulting. Accessed: Jun. 28, 2010. Printed: May 16, 2011. <http://www.pdvconsult.com/capabilities%20-%20daqsys.html>. pp. 1-10.
"Piston motion equations." Wikipedia, the Free Encyclopedia. Published: Jul. 4, 2010. Accessed: Aug. 7, 2010. Printed: Aug. 7, 2010. <http://en.wikipedia.org/wiki/Dopant>. pp. 1-9.
"Piston Velocity and Acceleration." EPI, Inc. Accessed: Jun. 28, 2010. Printed: May 16, 2011. <http://www.epi-eng.com/piston_engine_technology/piston_velocity_and_acceleration.htm>. pp. 1-3.
"SmartPlugs—Aviation." SmartPlugs.com. Published: Sep. 2000. Accessed: May 31, 2011. <http://www.smartplugs.com/news/aeronews0900.htm>. pp. 1-3.
Bell et al. "A Super Solar Flare." NASA Science. Published: May 6, 2008. Accessed: May 17, 2011. <http://science.nasa.gov/science-news/science-at-nasa/2008/06may_carringtonflare/>. pp. 1-5.
Birchenough, Arthur G. "A Sustained-arc Ignition System for Internal Combustion Engines." Nasa Technical Memorandum (NASA TM-73833). Lewis Research Center. Nov. 1977. pp. 1-15.
Britt, Robert Roy. "Powerful Solar Storm Could Shut Down U.S. For Months—Science News | Science & Technology | Technology News—FOXNews.com." FoxNews.com, Published: Jan. 9, 2009. Accessed: May 17, 2011. <http://www.foxnews.com/story/0,2933,478024,00.html>. pp. 1-2.
Brooks, Michael. "Space Storm Alert: 90 Seconds from Catastrophe." NewScientist. Mar. 23, 2009. pp. 1-7.
Doggett, William. "Measuring Internal Combustion Engine In-Cylinder Pressure with LabVIEW." National Instruments. Accessed: Jun. 28, 2010. Printed: May 16, 2011. <http://sine.ni.com/cs/app/doc/p/id/cs-217>. pp. 1-2.
Erjavec, Jack. "Automotive Technology: a Systems Approach, vol. 2." Thomson Delmar Learning. Clifton Park, NY. 2005. p. 845.
Hodgin, Rick. "NASA Studies Solar Flare Dangers to Earth-based Technology." TG Daily. Published: Jan. 6, 2009. Accessed: May 17, 2011. <http://www.tgdaily.com/trendwatch/40830-nasa-studies-solar-flare-dangers-to-earth-based-technology>. pp. 1-2.
Hollembeak, Barry. "Automotive Fuels & Emissions." Thomson Delmar Learning. Clifton Park, NY. 2005. p. 298.
InfraTec GmbH. "Evaluation Kit for FPI Detectors | Datasheet—Detector Accessory." 2009. pp. 1-2.
Lewis Research Center. "Fabry-Perot Fiber-Optic Temperature Sensor." NASA Tech Briefs. Published: Jan. 1, 2009. Accessed: May 16, 2011. <http://www.techbriefs.com/content/view/2114/32/>.
Pall Corporation, Pall Industrial Hydraulics. Increase Power Output and Reduce Fugitive Emissions by Upgrading Hydrogen Seal Oil System Filtration. 2000. pp. 1-4.
Riza et al. "All-Silicon Carbide Hybrid Wireless-Wired Optics Temperature Sensor Network Basic Design Engineering for Power Plant Gas Turbines." International Journal of Optomechatronics, vol. 4, Issue 1. Jan 2010. pp. 1-9.
Riza et al. "Hybrid Wireless-Wired Optical Sensor for Extreme Temperature Measurement in Next Generation Energy Efficient Gas Turbines." Journal of Engineering for Gas Turbines and Power, vol. 132, Issue 5. May 2010. pp. 051601-1-051601-11.
Salib et al. "Role of Parallel Reformable Bonds in the Self-Healing of Cross-Linked Nanogel Particles." Langmuir, vol. 27, Issue 7. 2011. pp. 3991-4003.
U.S. Appl. No. 13/843,976, McAlister.
U.S. Appl. No. 13/797,351, McAlister.
U.S. Appl. No. 13/844,240, McAlister.
U.S. Appl. No. 13/844,488, McAlister.
International Search Report and Written Opinion for Application No. PCT/US2009/067044; Applicant: McAlister Technologies, LLC.; Date of Mailing: Apr. 14, 2010 (11 pages).
International Search Report and Written Opinion for Application No. PCT/US2010/002080; Applicant: McAlister Technologies, LLC.; Date of Mailing: Jul. 7, 2011 (8 pages).
International Search Report and Written Opinion for Application No. PCT/US2010/054364; Applicant: McAlister Technologies, LLC.; Date of Mailing: Aug. 22, 2011, 8 pages.
International Search Report and Written Opinion for Application No. PCT/US2011/024778 Applicant: McAlister Technologies, LLC.; Date of Mailing: Sep. 27, 2011, (10 pages).
International Search Report and Written Opinion for Application No. PCT/US2010/042815; Applicant: McAlister Technologies, LLC.; Date of Mailing: Apr. 29, 2011 (10 pages).
Supplementary European Search Report for Application No. EP 10846264.9; Applicant McAlister Technologies, LLC.; Date of Mailin Oct. 2, 2013, 5 pages.

\* cited by examiner

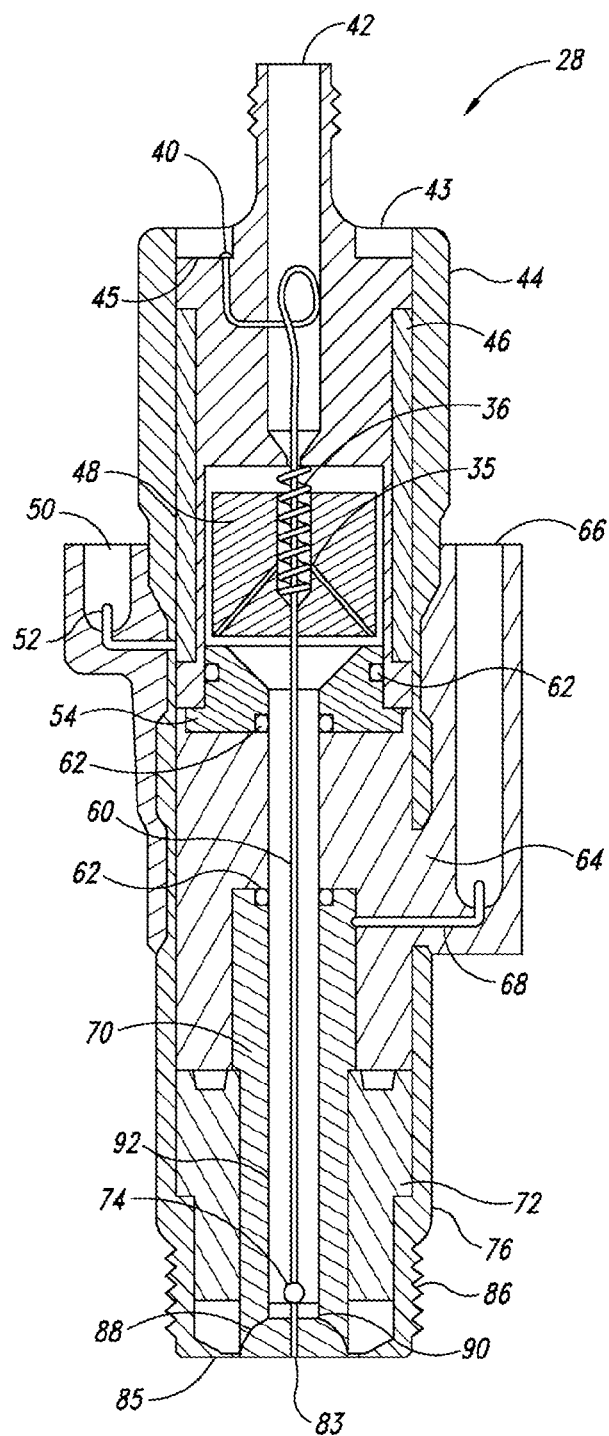
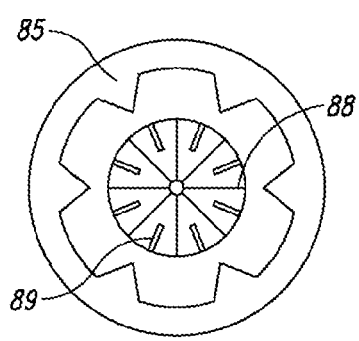
FIG. 2
FIG. 3

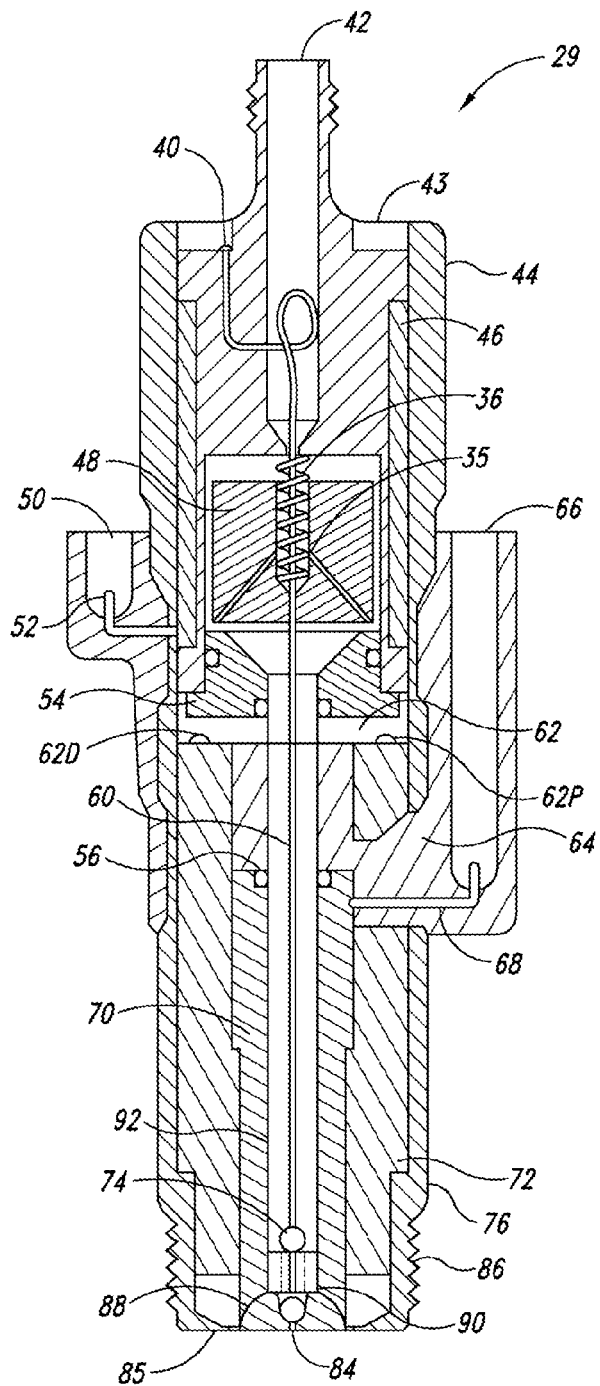
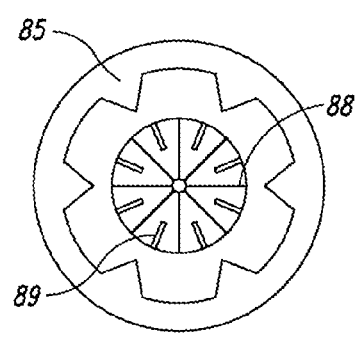
FIG. 4
FIG. 5

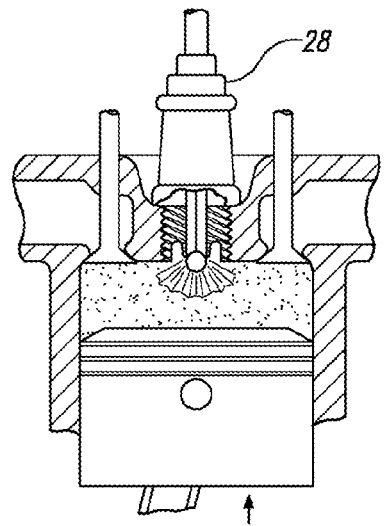
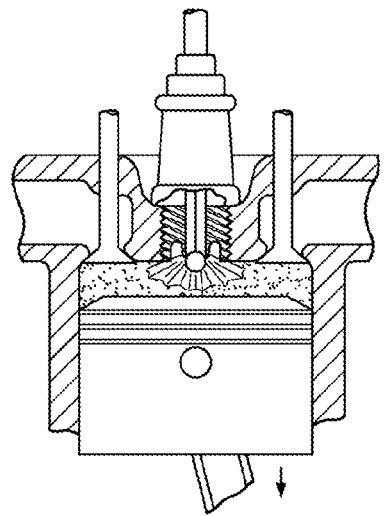
*FIG. 12A*  *FIG. 12B*
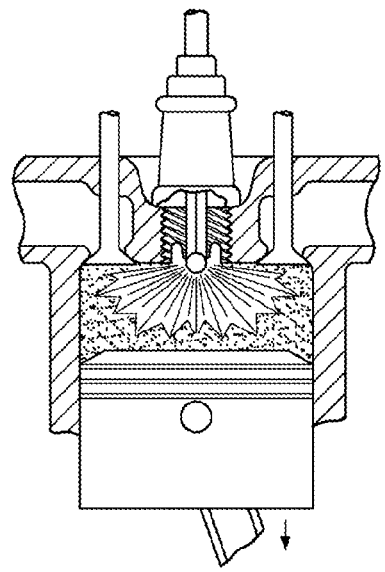
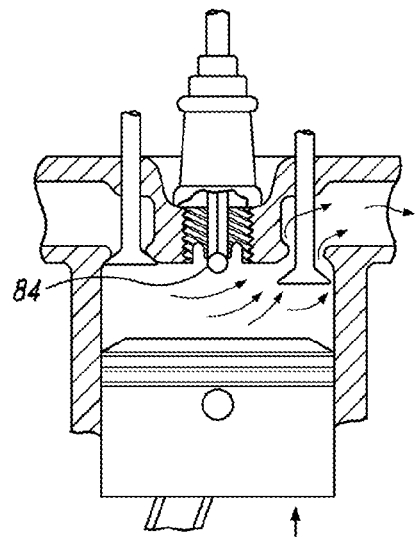
*FIG. 12C*  *FIG. 12D*

MULTIFUEL STORAGE, METERING AND IGNITION SYSTEM

CROSS-REFERENCE TO RELATED APPLICATION(S)

This application is a continuation of U.S. patent application Ser. No. 12/581,825, filed Oct. 19, 2009 and titled MULTIFUEL STORAGE, METERING AND IGNITION SYSTEM, which is a division of U.S. patent application Ser. No. 12/006,774, filed on Jan. 7, 2008 and titled MULTIFUEL, STORAGE, METERING AND IGNITION SYSTEM, each of which is incorporated herein by reference in its entirety.

This invention relates to the interchangeable utilization of numerous fuel types in heat engines, fuel cells, and appliances. The purpose of the invention is to provide Civilization with an option to overcome the interrelated dilemmas of environmental degradation, health threats, greenhouse gas induced climate changes, economic inflation and hardship, and international conflicts due to dependence upon depletive use of more than one million years of fossil coal, oil, and natural gas accumulations each year to produce electricity and for transportation fuels. A corollary purpose is to enable much greater returns on the enormous investments that have been made to produce over 800 million engines and the equipment that they power.

BACKGROUND

Renewable resources are intermittent for producing needed replacement energy in various forms such as electricity, hydrogen, fuel alcohols and methane. Solar energy is a daytime event and the daytime concentration varies seasonally and with weather conditions. In most areas, wind energy is intermittent and highly variable in magnitude. Falling water resources vary seasonally and are subject to extended draughts. In most of the Earth's landmass, biomass is seasonally variant and subject to draughts. Throughout the world, considerable energy that could be delivered by hydroelectric plants, wind farms, biomass conversion and solar collectors is wasted because of the lack of practical ways to save kinetic energy, fuel and/or electricity until it is needed.

The world population and demand for energy has grown to the point of requiring more oil than can be produced. Future rates of production will decline while demands of increasing population and increasing dependence upon energy-intensive goods and services accelerate. This will hasten the rate of fossil depletion. Cities suffer from smog caused by the use of fossil fuels. Utilization of natural gas including natural gas liquids such as ethane, propane, and butane for non-fuel purposes has increased exponentially in applications such as fabrics, carpeting, paint, and appliances that are made largely from thermoplastic and thermoset polymers.

Coal has relatively low hydrogen to carbon ratio. Oil has higher hydrogen to carbon ratio and natural gas has the highest hydrogen to carbon ratio of fossil hydrocarbons. Using oil as the representative medium, the global burn rate of fossil hydrocarbons now exceeds the equivalent of 200 million barrels of oil per day.

Global oil production has steadily increased to meet growing demand but the rate of oil discovery has failed to keep up with production. Peak production of oil has occurred and the rates of oil production in almost all known reserves are steadily decreasing. After peak production, the global economy experiences inflation of every energy-intensive and petrochemical-based product. Conflict over remaining fossil fuel resources and the utilization of oil to fuel and lubricate machines of destruction spurred World War I, World War II, and every war since then. Replacing the fossil fuel equivalent of 200 million barrels of oil each day requires development of virtually every practical approach to renewable energy production, distribution, storage, and utilization.

Air and water pollution caused by fossil fuel production and combustion now degrades every metropolitan area along with fisheries, farms and forests. Mercury and other heavy metal poisoning of fisheries and farm soils is increasingly traced to coal combustion. Global climate changes including more powerful hurricanes and tornados, torrential rainstorms, and increased incidents of fire losses due to lightning strikes in forests and metropolitan areas are closely correlated to atmospheric buildup of greenhouse gases released by combustion of fossil fuels. With increased greenhouse gas collection of solar energy in the atmosphere greater work is done by the global atmospheric engine including more evaporation of ocean waters, melting of glaciers and polar ice caps, and subsequent extreme weather events that cause great losses of improved properties and natural resources.

Previous attempts to utilize multifuel selections including hydrogen, producer gas, and higher hydrogen-to-carbon ratio fuels such as methane, fuel alcohols, and various other alternative fuels along with or in place of gasoline have variously encountered and failed to solve difficult problems albeit with expensive efforts, unreliable results, and frequently cause engine degradation or damage including:

1) Greater curb weight to increase engine compression ratio and corresponding requirements for more expensive, stronger, and heavier pistons, connecting rods, crankshafts, bearings, flywheels, engine blocks, and support structure for acceptable power production and therefore heavier suspension springs, shock absorbers, starters, batteries, etc., etc.
2) Requirements for more expensive valves, hardened valve seats and machine shop installation to prevent valve wear and seat recession.
3) Requirements to supercharge to recover power losses and drivability due to reduced fuel energy per volume and to overcome compromised volumetric and thermal efficiencies.
4) Multistage gaseous fuel pressure regulation with extremely fine filtration and very little tolerance for fuel quality variations including vapor pressure, octane and cetane ratings.
5) Engine coolant heat exchangers for prevention of gaseous fuel pressure regulator freeze ups.
6) Special fuel storage tanks for low energy density fuels.
7) Special fuel storage systems for fuels that change phase.
7) Expensive and bulky solenoid operated tank shutoff valve (TSOV) and pressure relief valve (PRD) systems.
8) Remarkably larger flow metering systems.
9) After dribble delivery of fuel at wasteful times and at times that produce back-torque.
10) After dribble delivery of fuel at harmful times such as the exhaust stroke to cause engine damage.
11) Engine degradation or failure due to pre-detonation and combustion knock.
12) Engine hesitation or damage due to failures to closely control fuel viscosity, vapor pressure, octane rating, and burn velocity,
13) Engine degradation or failure due to fuel washing, vaporization and burn-off of lubricative films on cylinder walls and ring or rotor seals.
14) Failure to prevent oxides of nitrogen formation during combustion.

15) Failure to prevent formation of particulates due to incomplete combustion.
16) Failure to prevent pollution due to aerosol formation of lubricants in upper cylinder areas.
17) Failure to prevent overheating of pistons, friction increases, and degradation.
18) Failure to overcome damaging backfiring in intake manifold and air cleaner.
19) Failure to overcome damaging combustion and/or explosions in the exhaust system.
20) Failure to overcome overheating of exhaust system components.
21) Failure to overcome fuel vapor lock and resulting engine hesitation or failure.

Storage tanks designed for gasoline, propane, natural gas and hydrogen are discreet to meet the widely varying chemical and physical properties of each fuel. A separate fuel tank is required for each fuel type that a vehicle may utilize. This dedicated tank approach for each fuel selection takes up considerable space, adds weight, requires additional spring and shock absorber capacity, changes the center of gravity and center of thrust, and is very expensive.

In conventional approaches, metering alternative fuel choices such as gasoline, methanol, ethanol, propane, ethane, butane hydrogen or methane into an engine may be accomplished by one or more gaseous carburetors, throttle body fuel injectors, or by timed port fuel injectors. Power loss sustained by each conventional approach varies because of the large percentage of intake air volume that the expanding gaseous fuel molecules occupy. Thus, with reduced intake air entry, less fuel can be burned, and less power is developed.

At standard temperature and pressure (STP) gaseous hydrogen occupies 2,800 times larger volume than liquid gasoline for delivery of equal combustion energy. Gaseous methane requires about 900 times as much volume as liquid gasoline to deliver equal combustion energy.

Arranging for such large volumes of gaseous hydrogen or methane to flow through the vacuum of the intake manifold, through the intake valve(s) and into the vacuum of a cylinder on intake cycle and to do so along with enough air to support complete combustion to release the heat needed to match gasoline performance is a monumental challenge that has not been adequately met. Some degree of power restoration may be available by resorting to expensive, heavier, more complicated, and less reliable components for much higher compression ratios and/or by supercharging the intake system. However, these approaches cause shortened engine life and much higher original and/or maintenance costs unless the basic engine design provides adequate structural sections for stiffness and strength.

Engines designed for gasoline operation are notoriously inefficient. To a large extent this is because gasoline is mixed with air to form a homogeneous mixture that enters the combustion chamber during the throttled conditions of the intake cycle. This homogeneous charge is then compressed to near top dead center (TDC) conditions and spark ignited. Homogeneous-charge combustion causes immediate heat transfer from 4,500 to 5,500° F. (2,482 to 3,037° C.) combustion gases to the cylinder head, cylinder walls, and piston or corresponding components of rotary engines. Protective films of lubricant are burned or evaporated causing pollutive emissions and the cylinder and piston rings suffer wear due to lack of lubrication. Homogeneous charge combustion also forces energy loss as heat is transferred to cooler combustion chamber surfaces, which are maintained at relatively low temperatures of 160 to 240° F. (71 to 115° C.) by liquid and/or air-cooling systems.

Utilization of hydrogen or methane as homogeneous charge fuels in place of gasoline is presents an expensive challenge to provide sufficient fuel storage to accommodate the substantial energy waste that is typical to gasoline engines. Substitution of such cleaner burning and potentially more plentiful gaseous fuels in place of diesel fuel is even more difficult. Diesel fuel has a greater energy value per volume than gasoline. Additional difficulties arise because gaseous fuels such as hydrogen, producer gas, methane, propane, butane, and fuel alcohols such as ethanol or methanol lack the proper cetane ratings and do not ignite in rapidly compressed air as required for efficient diesel-engine operation. Diesel fuel injectors are designed to operate with a protective film of lubrication that is provided by the diesel oil. Further, diesel fuel injectors only cyclically pass a relatively miniscule volume of fuel, which is about 3,000 times smaller (at STP) than the volume of hydrogen required to deliver equivalent heating value.

Most modern engines are designed for minimum curb weight and operation at substantially excess oxygen equivalence ratios in efforts with homogeneous charge mixtures of air and fuel to reduce the formation of oxides of nitrogen by limiting the peak combustion temperature. In order to achieve minimum curb weight, smaller cylinders and higher piston speeds are utilized. Higher engine speeds are reduced to required shaft speeds for propulsion through higher-ratio transmission and/or differential gearing.

Operation at excess oxygen equivalence ratios requires greater air entry and combustion chamber heads often have two or three intake valves and two or three exhaust valves. This leaves very little room in the head area for a direct cylinder fuel injector or for a spark plug. Operation of higher speed valves by overhead camshafts further complicates and reduces the space available for direct cylinder fuel injectors and spark plugs. Designers have used virtually all of the space available over the pistons for valves and valve operators and have barely left room to squeeze in sparkplugs for gasoline ignition or for diesel injectors for compression-ignition engines.

Therefore it is extremely difficult to deliver by any conduit greater in cross section than the gasoline engine spark plug or the diesel engine fuel injector equal energy by alternative fuels such as hydrogen, methane, propane, butane, ethanol, or methanol all of which have lower heating values per volume than gasoline or diesel fuel. The problem of minimal available area for spark plugs or diesel fuel injectors is exacerbated by larger heat loads in the head due to the greater heat gain from three to six valves that transfer heat from the combustion chamber to the head and related components. Further exacerbation of the space and heat load problems is due to greater heat generation in the cramped head region by cam friction, valve springs and valve lifters in high-speed operations.

In order to meet desires for multifuel utilization along with lower curb weight and greater air entry it is ultimately important to allow unthrottled air entry into the combustion chambers and to directly inject gaseous, cleaner-burning, and less-expensive fuels and to provide stratified-charge combustion as a substitute for gasoline and diesel (petrol) fuels. However this desire encounters the extremely difficult problems of providing dependable metering of such widely variant fuel densities, vapor pressures, and viscosities and to then assure subsequent precision timing of ignition. In order to achieve positive ignition it is necessary to provide a spark-ignitable air-fuel mixture in the relatively small gap between spark electrodes.

If fuel is delivered by a separate fuel injector to each combustion chamber in an effort to produce a stratified charge, elaborate provisions such as momentum swirling or ricocheting or rebounding the fuel from combustion chamber surfaces into the spark gap must be arranged but these approaches always cause compromising heat losses to combustion chamber surfaces as the stratified charge concept is sacrificed. If fuel is controlled by a metering valve at some distance from the combustion chamber, "after dribble" of fuel at wasteful or damaging times including times that produce torque opposing the intended torque will occur. Either approach inevitably causes much of the fuel to "wash" or impinge upon cooled cylinder walls in order for some small amount of fuel to be delivered in a spark-ignitable air-fuel mixture in the spark gap at the precise time of desired ignition. This results in heat losses, loss of cylinder-wall lubrication, friction-producing heat deformation of cylinders and pistons, and loss of thermal efficiency due to heat losses to non-expansive components of the engine.

Efforts to produce swirl of air entering the combustion chamber and to place lower density fuel within the swirling air suffer two harmful characteristics. The inducement of swirl causes impedance to the flow of air into the combustion chamber and thus reduces the amount of air that enters the combustion chamber to cause reduced volumetric efficiency. After ignition, products of combustion are rapidly carried by the swirl momentum to the combustion chamber surfaces and adverse heat loss is accelerated.

Past attempts to provide internal combustion engines with multifuel capabilities such as the ability to change between fuel selections such as gasoline, natural gas, propane, fuel alcohols, producer gas and hydrogen have proven to be extremely complicated and highly compromising. Past approaches induced the compromise of detuning all fuels and cancel optimization techniques for specific fuel characteristics. Such attempts have proven to be prone to malfunction and require very expensive components and controls. These difficulties are exacerbated by the vastly differing specific energy values of such fuels, wide range of vapor pressures and viscosities and other physical property differences between gaseous fuels and liquid fuels. Further, instantaneous redevelopment of ignition timing is required because methane is the slowest burning of the fuels cited while hydrogen burns about 7 to 10 times faster than any of the other desired fuel selections.

Additional problems are encountered between cryogenic liquid or slush and compressed-gas fuel storage of the same fuel substance. Illustratively liquid hydrogen is stored at −420° F. (−252° C.) at atmospheric pressure and causes unprotected delivery lines, pressure regulators, and injectors to condense and freeze atmospheric water vapor and become ice damaged as a result of exposure to atmospheric humidity. Cryogenic methane encounters similar problems of ice formation and damage. These super cold fluids also cause ordinary metering orifices, particularly small orifices, to malfunction and clog.

The very difficult problem that remains and must be solved is how can a vehicle be refueled quickly with dense liquid fuel at a cryogenic (hydrogen or methane) or ambient temperature (propane or butane) and at idle or low power levels use vapors of such fuels and at high power levels use liquid delivery of such fuels in order to meet energy production requirements?

At atmospheric pressure, injection of cryogenic liquid hydrogen or methane requires precise metering of a very small volume of dense liquid compared to a very large volume delivery of gaseous hydrogen or methane. Further it is imperative to precisely produce, ignite, and combust stratified charge mixtures of fuel and air regardless of the particular multifuel selection that is delivered to the combustion chamber.

Accomplishment of essential goals including highest thermal efficiency, highest mechanical efficiency, highest volumetric efficiency, and longest engine life with each fuel selection requires precise control of the fuel delivery timing, combustion chamber penetration and pattern of distribution by the entering fuel, and precision ignition timing, for optimizing air utilization, and maintenance of surplus air to insulate the combustion process with work-producing expansive medium.

In order to sustainably meet the energy demands of the global economy it is necessary to improve production, transportation, and storage of methane and hydrogen by virtually every known means. A gallon of cryogenic liquid methane at −256° C. provides an energy density of 89,000 BTU/gal about 28% less than a gallon of gasoline. Liquid hydrogen at −252° C. provides only about 29,700 BTU/gal or 76% less than gasoline.

It has long been desired to interchangeably use methane, hydrogen or mixtures of methane and hydrogen as cryogenic liquids or compressed gases in place of gasoline in spark ignited engines. But this goal has not been satisfactorily achieved and as a result the vast majority of motor vehicles remain dedicated to petrol even though the costs of methane and many forms of renewable hydrogen are far less than gasoline. Similarly it has long been a goal to interchangeably use methane, hydrogen or mixtures of methane and hydrogen as cryogenic liquids and/or compressed gases in place of diesel fuel in compression-ignited engines but this goal has proven even more elusive and most diesel engines remain dedicated to pollutive and more expensive diesel fuel.

SUMMARY

An object of the present invention is to overcome the problems noted above. In accordance with the principles of the present invention, this objective is accomplished by providing a multifuel system for interchangeably storing and precisely metering and igniting gaseous fuel selections of widely varying chemical and physical properties along with liquid fuels such as cryogenic methane and hydrogen and with ambient temperature liquid fuels such as ethane, propane butane and fuel alcohols. Thus the invention is a system for interchangeably storing and utilizing a wide variety of fuels as gases, vapors, liquids, and slush mixtures of liquid and solids and efficiently utilizing such fuels as stratified charge combustants in unthrottled air of a heat engine.

A related object is to optimize the use in an internal-combustion engine of virtually any fluid fuel regardless of octane rating, cetane index, viscosity, vapor pressure, or burn rate.

It is an object of the invention to eliminate dribbles of fuel into the combustion chamber at times that waste fuel.

Another object of the invention is to eliminate admission of fuel into the combustion chamber at times that would cause loss of intended torque production.

Another object is to optimize the use in a fuel cell or in an internal-combustion engine with virtually any fluid fuel regardless of octane rating, cetane rating, viscosity, vapor pressure, or burn rate regardless of the compression ratio of the engine.

Another object is to provide a system that achieves desired pressure delivery for optimizing air utilization within a combustion zone.

Another object of the present invention is to minimize heat loss by stratified-charge combustion within excess air.

It is an object to provide universal storage, fail safe provisions, and precision metering of fuels with widely varying critical temperatures, vapor pressures, viscosities, octane ratings, and combustion velocities in operation of internal combustion engines and in fuel cells.

It is an object to provide compact devices that readily replace spark plugs in gasoline engines to enable delivery of multiple fuel selections and ignition of such fuel selections to produce stratified charge combustion.

It is an object to provide compact devices that readily replace diesel fuel injectors in diesel engines to enable delivery of multiple fuel selections and ignition of such fuel selections to produce stratified charge combustion.

It is an object to provide highly durable and minimal cross section devices that readily replace spark plugs or diesel fuel injectors and enable delivery of multiple fuel selections and ignition of such fuel selections to produce stratified charge combustion.

It is an object to provide devices that readily replace spark plugs or diesel fuel injectors and enable delivery of multiple fuel selections and ignition of such fuel selections to produce homogeneous charge combustion when desired.

It is an object to provide fail safe provisions for interchangeable storage of fuel elections that have greatly varying physical properties including vapor pressure, specific heats, and heating value densities.

It is an object to utilize ubiquitous engines with multiple fuel selections in electricity and heat generation regimes.

It is an object to utilize hydrogen to transfer heat from rotating electrical equipment.

It is an object to utilize hydrogen characterized multiple fuel selections to overcome emissions of hydrocarbons.

It is an object to utilize hydrogen characterized multiple fuel selections to overcome emissions of nitrous compounds from heat engines.

It is an object to utilize hydrogen characterized multiple fuel selections to overcome emissions of particulates from heat engines.

It is an object to utilize hydrogen characterized multiple fuel selections to overcome emissions of carbon compounds.

It is an object to store mixtures of gas, vapors, liquids and solids.

It is an object to utilize hydrogen characterized multiple fuel selections to improve generator efficiency in hybrid and distributed energy applications.

It is an object to provide for production of homogeneous charge combustion or stratified charge combustion of fuels or to combine homogeneous charge and stratified charge combustion of multiple fuel selections.

It is an object of the present invention to greatly improve the scope of application, capabilities, and benefits of previous inventions by synergistic combinations with such inventions.

It is an object of the invention to utilize embedded pressure transducers to monitor combustion chamber events for purposes of controlling such matters as quantity of fuel delivery, timing of fuel delivery, timing of ignition, pressure of fuel delivery and the use of multiple fuel injections and/or multiple spark ignitions, These and other objects of the present invention will become more apparent during the course of the following detailed description and appended claims.

My invention may be best understood with reference to the accompanying drawings, wherein illustrative embodiments are shown.

BRIEF DESCRIPTION OF THE DRAWINGS

FIG. 2 is a longitudinal section of a component assembly of an embodiment that is operated in accordance with the present invention.

FIG. 3 is an end view of the component assembly of FIG. 2.

FIG. 4 is a section view of components used an embodiment of the invention.

FIG. 5 is an end view of embodiments of the invention.

FIGS. 12A, 12B, 12C, and 12 D illustrates operation of the invention as provided in accordance with the principles of the invention.

DETAILED DESCRIPTION

Figure 1:
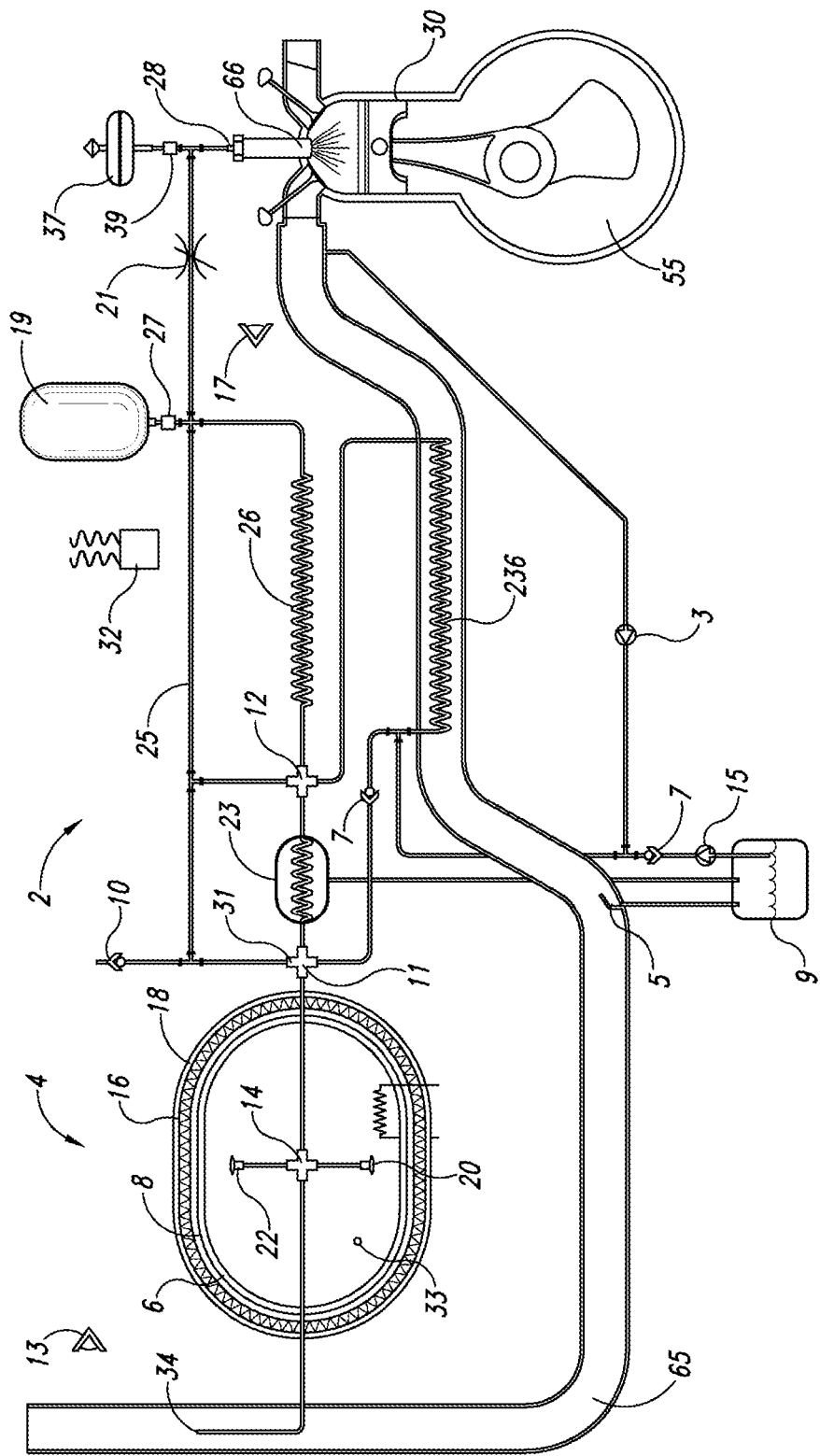
FIG. 1 is a schematic illustration including sectional views of certain components of a system operated in accordance with the principles of the present invention.

FIG. 1 shows a system 2 by which fuel selections of greatly varying temperature, energy density, vapor pressure, combustion speed, and air utilization requirements are safely stored and interchangeably injected and ignited in a combustion chamber. Fuel storage tank 4 is provided with an impervious and chemically compatible fuel containment liner 6 that is sufficiently over wrapped with fiber reinforcement 8 to withstand test pressures of 7,000 atmospheres or more and cyclic operating pressures of 3,000 atmospheres or more as needed to store gases and/or vapors of liquids as densely as much colder vapors, liquids or solids.

Quick filling of tank 4 is provided by flow through fill port 10, four-way valve 11, and four-way valve 14 as shown. Thermal insulation and support of pressure assembly 6 and 8 is provided by reflective dielectric layers 16 and sealing layer 18 which are designed to provide support and protection of storage system 6 and 8 while minimizing heat transfer to or from storage in 6 as shown. Transparent films of glass or polymers that are very thinly coated on one side with reflective metals such as aluminum or silver or that provide for reflection because of index of refraction differences between materials selected for alternating layers provide reflection of radiant energy and extremely low rates of thermal conduction.

Depending upon the length of time needed for substantial utilization of the coldest fuel stored in assembly 6 and 8, the effective length of the heat conduction path and number of reflective layers of insulation 16 selected provide for heat blocking sufficient to minimize or prevent humidity condensation and ice formation at the sealed surface of 18. Tank 4 thus also provides for acceptable development of pressure storage as cryogenic solids, liquids, and vapors become pressurized fluids with very large energy density capacities at ambient temperatures. Similarly fluids such as cool ethane and propane can be filled in assembly 4 without concern about pressure development that occurs when the tank is warmed to ambient conditions.

Tank 4 also provides safe storage of solids such as super cold hydrogen solids as a slush within cryogenic liquid hydrogen and super cold methane solids as a slush within cryogenic liquid hydrogen or methane. Melting of such solids and the formation of liquids and subsequent heating of such liquids to form vapors are well within the safe containment capabilities of assembly 6 and 8 while ice prevention on surface 18 and damage to surface components is prevented by the insulation system 16 and 18.

Suitable fluid fuels for transfer into and storage within tank 4 include cryogenic hydrogen and/or methane. It is also convenient and safe to fill and store tank 4 with ethane, propane, butane, methanol, or ethanol. Gasoline or clean diesel fuel could also be stored in tank 4 but it would be recommended to use at least two tanks of ethanol or methanol before refilling with cryogenic fuels. This provides for very safe and convenient storage of the most desirable fuel to meet pollution avoidance, range, and fuel-cost goals. Utilization of hydrogen in urban areas to provide air-cleaning capabilities is contemplated while the interchangeable use of renewable producer gas mixtures of hydrogen and carbon monoxide, methanol, ethanol, ethane or propane is accommodated. This provides opportunities and facilitates competition by farmers and entrepreneurs to produce and distribute a variety of fuels and meet the needs of motorists and co-generators that desire storage for longer-range capabilities and/or lower-cost fuels.

Fuel delivery from tank 4 may be from the bottom of the tank through strainer 20 or from the top of the tank through strainer 22 to according to the desired flow path by valve 14 as shown. In instances that tank containment assembly 6 and 8 is subjected to severe abuse such as the blast of a full stick of dynamite, or the impact of a 100 MPH collision, or 6 bullets from a .357 magnum pistol; containment of the fuel selection within liner 6 and integral reinforcement 8 is safely maintained. Super jacket assembly of 16 and 18 minimizes radiative, conductive, and convective heat transfer, increases the fire rating by reflecting radiation, insulates against all forms of heat gain, and dissipates heat for a much longer time than conventional tanks. However in case of extended exposure to fire the temperature of assembly 6 and 8 or the storage pressure may eventually build to the point of requiring relief. At the point that the temperature and/or pressure builds to a suitable percentage of maximum allowable storage, embedded pressure sensor 31 and temperature sensor 33 report information by wireless, fiber optic, or wire connection to "black-box" controller 32 to signal four-way valve 14 to first prioritize sending additional fuel to engine 30 as shown. If engine 30 is not operating at the time its status is interrogated by controller 32 to determine if it is safe and desirable to run with or without a load. If it is desirable, engine 30 is started and/or shifted to operation at sufficient fuel consumption rates to prevent over pressurization or over temperature conditions within tank assembly 4.

Injector device 28 facilitates very rapid automatic starting of engine 30 and can, contrary to the preferred normal high efficiency mode of operation, provide for low fuel efficiency with injection and ignition timing to produce homogeneous charge combustion and considerable backwork. Thus fuel can be consumed much more rapidly than with higher efficiency stratified charge operation with adaptively adjusted fuel injection and ignition timing to optimize thermal efficiency. Device 28 also facilitates engine operation during an abnormal application of air restriction to engine 30 ("throttled air entry") to produce an intake vacuum and this enables the fuel delivery system to greatly reduce the pressure to allow boiling or to provide suction on tank 4 to force evaporative fuel cooling in case it is necessary to remove very large heat gains due to prolonged fire impingement on tank 4. Such modes of useful application of fuel from tank 4 rather than dumping of fuel to the atmosphere to relieve pressure during exposure to fire is highly preferred because engine power can be delivered to water pumping applications to cool the tank and to extinguish the fire or to provide propulsion to escape from the fire. This mode of safe management of resources to overcome hazards is applicable in stationery power plants and emergency response vehicles, especially forest and building firefighting equipment.

If such failsafe provisions are not sufficient to prevent over pressurization or over temperature conditions in tank 4, additional fuel is dumped by pressure relief provisions within valve 14 to the air through safe stack 34 as shown. Safe stack 34 is preferably to a safe zone 65 designed for hot gas rejection such as to a chimney or to an exhaust pipe of a vehicle and to thus prevent harm to any person or property.

In normal operation, at cold engine start conditions with a cold fuel selection in tank 4, fuel vapors are taken from the top of storage tank 4 through strainer 22, multi-way valve 14, and by insulated conduit 25 to injector 28 for injection and ignition to form stratified-charge combustion and sudden heating of surplus air in all combustion chambers of engine 30 that are on power stroke. If more power is needed than provided by the fuel rate sustainable by the vapor supply in the top of tank 4 then liquid fuel is taken from the bottom of fuel tank 4 through strainer 20 and delivered to injector 28. After warm up of the engine, exhaust heat is used to pressurize and vaporize liquid fuel in heat exchanger 236. Heat exchanger 236 may incorporate one or more suitable catalysts for generation of new fuel species from liquid, vapor or gaseous fuel constituents.

Depending upon the chemical nature of the fuel stored in tank 4, heat exchanger 236 produces a variety of hydrogen-characterized fuels for improving the operation of engine 30. Illustratively wet methanol can be vaporized and dissociated by addition of heat to produce hydrogen and carbon monoxide as shown in Equation 1. Equation 2 shows endothermic reforming of inexpensive wet ethanol or with addition of an oxygen donor such as water:

$$2CH_3OH + H_2O + HEAT \rightarrow 5H_2 + CO + CO_2 \quad \text{Equation 1}$$

$$C_2H_5OH + H_2O + HEAT \rightarrow 4H_2 + 2CO \quad \text{Equation 2}$$

Thus the present invention enables utilization of biomass alcohols from much lower-cost production methods by allowing substantial water to be remain mixed with the alcohol as it is produced by destructive distillation, synthesis of carbon monoxide and hydrogen and/or by fermentation and distillation. This enables more favorable energy economics as less energy and capital equipment is required to produce wet alcohol than dry alcohol. Further it facilitates the utilization of waste heat from an engine to endothermically create hydrogen and carbon monoxide fuel derivatives and to release up to 25% more combustion energy than the feedstock of dry alcohol. Additional benefits are derived from the faster and cleaner burning characteristics provided by hydrogen. By utilization of injector 28 to meter and ignite such hydrogen-characterized derivative fuel as a stratified charge in unthrottled air, overall fuel efficiency improvements of more than 40% compared to homogeneous charge combustion of dry alcohol(s) are achieved.

Water for the endothermic reactions shown in Equations 1 and 2 can also be supplied by an auxiliary water storage tank 9, and/or by collection of water from the exhaust stream and addition to auxiliary tank 9, or by premixing water and, if needed, a solubility stabilizer with the fuel stored in tank 4 and/or by collection of water that condenses from the atmosphere in air flow channel 23 upon surfaces of heat exchanger 236. Pump 15 provides delivery of water through check valve 7 to heat exchange reactor 236 at a rate proportional the fuel rate through valve 11 and check valve 7 to meet stoichiometric reforming reactions.

Fuel alcohols such as ethanol, methanol, isopropanol etc., are soluble in stoichiometric proportions with water and produce considerably more hydrogen on endothermic reforming as generally illustrated and summarized by Equations 1 and 2. This enables much lower cost fuel to be advantageously utilized on farms and by other small businesses. Cost savings include the reduction in refinement energy to remove water and transportation from distant refineries.

Burning any hydrocarbon, hydrogen, or a hydrogen-characterized fuel in engine 30 assures the presence of water in the exhaust of the engine. Substantial portions of such exhaust stream water can be recovered at liquid stripper 5 after cooling the exhaust gases below the dew point. Countercurrent heat exchanger/reactor 236 provides most if not all of the heat needed for endothermic reactions characterized by Equations 1 and 2 and doing so dramatically cools the exhaust. Depending upon the countercurrent flow rates and areas provided, the exhaust gases can be cooled to near the fuel storage temperature. This readily provides condensation of water and in numerous additional new embodiments, the invention applying of this application are combined with my processes for storing fuels and/or utilizing exhaust heat to power bottoming cycles and/or in combination with hybridized engines, electrolyzers, reversible fuel cells and/or to collect water as disclosed in U.S. Pat. Nos. 6,756,140; 6,155,212; 6,015,065; 6,446,597; 6,503,584, 5,343,699; and 5,394,852 and my co-pending patent applications including Ser. No. 60/551,219. All of the referenced invention disclosures are incorporated herein for such new combinations and synergistic results.

In instances that sufficient heat is not available or the desired temperature for endothermic reforming reactions in reactor 236 has not been achieved, it is preferred to use pump 3 to add oxygen-rich exhaust gases to reactor 236 as shown. This facilitates a combination of exothermic reactions between oxygen and the fuel species present to produce carbon monoxide and/or carbon dioxide along with hydrogen along with endothermic reforming reactions that are bolstered by the additional heat release. In conventional use of the products of reactions within reactor 236 this would provide objectionable by-products such as nitrogen however SparkInjector device 28 is uniquely capable of injecting and quickly delivering large gaseous volumes into the combustion chamber at or near top dead center or during power stroke times and conditions that do not compromise the volumetric or thermal efficiencies of engine 30.

Thus fuel containing hydrogen is stored by tank 4 in a condition selected from the group including cryogenic slush, cryogenic liquid, pressurized cold vapor, adsorbed substance, ambient temperature supercritical fluid, and ambient temperature fluid and by heat addition from the exhaust of an engine and converted to an elevated temperature substance selected from the group including hot vapors, new chemical species, and mixtures of new chemical species and hot vapors and injected into the combustion chamber of an engine and ignited. Sufficient heat may be removed from engine 30's exhaust gases to cause considerable condensation of water which is preferably collected for the purpose of entering into endothermic reactions in higher temperature zones of reactor 236 with the fuel containing hydrogen to produce hydrogen as shown. Equation 3 shows the production of heat and water by combustion of a hydrocarbon fuel such as methane.

$$CH_4 + 3O_2 \rightarrow CO_2 + 2H_2O \quad \text{Equation 3}$$

Equation 4 shows the general process for reforming of hydrocarbons such as methane, ethane, propane, butane, octane, gasoline, diesel fuel, and other heavier fuel molecules with water to form mixtures of hydrogen and carbon monoxide.

$$CxHy + XH_2O + HEAT \rightarrow (0.5Y+X)H_2 + XCO \quad \text{Equation 4}$$

Equations 3, 5, and 6 show that the amount of water produced by combustion of a hydrocarbon such as methane is two- or three times as much water as needed to reform methane into more desirable hydrogen-characterized fuel.

$$CH_4 + H_2O + HEAT \rightarrow 3H_2 + CO \quad \text{Equation 5}$$

Equation 6 shows the advantage of reforming a hydrocarbon such as methane and burning the resultant fuel species of Equation 5 to produce more expansion gases in the power stroke of the combustion chamber along with producing more water for reforming reactions in reactor 236.

$$3H_2 + CO + 2O_2 \rightarrow 3H_2O + CO_2 \quad \text{Equation 6}$$

In other words, reforming methane with water to make and combust producer gas (hydrogen and carbon monoxide) provides more combustion energy and about three-times as much product water as needed for the endothermic reformation of methane in reactor 236. Thus along with water condensed in heat exchanger 23 ample water can be collected by a vehicle or stationery application of the present invention. This is a very important advantage for minimizing curb weight because most of the weight of water used in reactor 236 is gained by combustion oxygen from the air with hydrogen or hydrogen-characterized fuel in engine 30. Thus each gram of hydrogen combines with eight grams of atmospheric oxygen to provide nine grams of collectable water from the exhaust of engine 30.

Adequate purified water is supplied for operation of one or more electrolysis processes at high or low temperatures available by heat exchanges from engine 30 or cool fuel from tank 4 to support regenerative operations in hybrid vehicles and/or load leveling operations along with the reactions, including catalytically supported reactions, in heat exchanger 236. This is particularly beneficial to overall energy utilization efficiency and is provided by the synergistic combinations described herein and is further noteworthy because such ample supplies of pure water do not require bulky and maintenance-prone reverse osmosis, distillation systems, or other expensive and energy-consuming equipment.

Numerous other advantages are provided by the hydrogen-characterized fuels that are produced including:
1) Hydrogen burns 7 to 10 times faster than methane and similar hydrocarbons and this enables ignition timing to be much later than with the original hydrocarbon species and avoids substantial back work and heat loss that would have accompanied ignition during earlier stages of compression.
2) Hydrogen and carbon monoxide produced by endothermic reforming reactions release up to 25% more heat during combustion than the original hydrocarbon. This is due to the thermodynamic investment of endothermic heat in the formation of hydrogen and carbon monoxide from the original hydrocarbon. This is a particularly beneficial way to use waste heat from an engine's water jacket or air cooling system along with higher quality heat from the exhaust system as shown.
3) Hydrogen burns very cleanly and assures extremely rapid combustion propagation and assures complete combustion within excess air of any hydrocarbons that pass through the reforming reactions to become additional constituents of hydrogen-characterized fuel mixtures.

4) Rapid combustion of hydrogen and/or other fuel species in the presence of water vapors that are delivered by injector 28 rapidly heats such vapors for stratified-charge insulated expansion and work production in the combustion chamber to provide much greater operating efficiency compared to homogenous charge methods of water vapor expansion.
5) Rapid heating of water vapors along with production of water vapors by combustion greatly reduces oxides of nitrogen by reducing the peak temperature of products of combustion and by synergistic reaction of such reactive water vapors with oxides of nitrogen to greatly reduce the net development and presence of oxides of nitrogen in the exhaust gases.
6) Rapid ignition and heating by rapid combustion of hydrogen characterized fuel oxidation as uniquely established by injector 28 provides more time in the combustion chamber for beneficial synergistic reactions that completely oxidize all fuel constituents and reduce oxides of nitrogen in the exhaust stream.

Embodiment 28 of FIG. 2, called an injector, enables interchangeable utilization of original fuel substances or of hydrogen-characterized fuel species that result from the processes described. This includes petrol liquids, propane, ethane, butane, fuel alcohols, cryogenic slush, liquid, vaporous, or gaseous forms of the same fuel or of new fuel species produced by the thermochemical regeneration reactions of the present invention.

Embodiment 2 enables selection through circuits provided involving flow selections by valves 14, 11, 7, 12, and 27 as shown for utilization of fuel species and conditions including primary fuel from tank 4, warmed primary fuel from heat exchangers 23, 26, and/or 236, vaporized primary fuel from heat exchangers 23, 26, and/or 236, newly produced fuel species from reactor 236, warmed fuel from 236 combined with fuel from heat exchanger 23 and/or 26, and selection of the pressure for delivery to injector 28 by control of adjustable pressure regulator 21 to optimize variables including fuel delivery rate and penetration into the combustion chamber, local and overall air-fuel mixtures at the time selected for ignition, fuel combustion rate, and many other combinations and pennutations of these variables. This greatly improves the capabilities for adaptive fuel injection, fuel penetration pattern, air utilization, ignition, and combustion control to achieve numerous alternative optimization goals of the invention.

As shown in FIGS. 1 and 2, regulator 21 also delivers fuel to fuel cell 37 through control valve 39. Fuel cell 37 may be reversible to create hydrogen from a feedstock such as water and may be of any suitable type including low temperature and high temperature varieties and as characterized by electrolyte types. This enables fuels to be stored in tank 4 to be converted to fuel species more appropriate for higher efficiency applications in fuel cell 37 than could be provided by a system that provides such preferred fuel species by conventional reforming operations. Combination of such components and operations of the invention thus provide an extremely efficient hybridization and convenience in achieving greater operational efficiency and function.

FIG. 2 shows the preferred embodiment 28 of one of the solenoid actuated varieties of the fuel injection and positive ignition system shown in FIG. 1. injector 28 provides precision volumetric injection and ignition of fuels that vary greatly in temperature, viscosity, and density including slush hydrogen mixtures of solid and liquid hydrogen at −254° C. (−425° F.), hot hydrogen and carbon monoxide from reformed methanol at 150° C. (302° F.) or higher temperatures to diesel and gasoline liquids at ambient temperature. The enormous range of volumes that are required to provide partial or full rated power from such fuels by efficient operation of engine 30 requires adaptive timing of delivery and positively timed ignition of precision volumes, at precise times, with rapid repetition per engine cycle, all without injector dribble before or after the intended optimum injection timing. Avoidance of such dribble is extremely difficult and important to avoid fuel loss during the exhaust cycle and/or back work and/or heat loss by inadvertent and problematic fuel deliveries during the exhaust, intake or early compression periods.

This is accomplished by utilization where necessary of a very long distance of separation between the flow control valve 74 and valve actuator such as the solenoid valve operator consisting of insulated winding 46, soft magnet core 45, armature 48 and spring 36 as shown. In order to meet extremely tight space limitations and do so in the "hot-well" conditions provided within engine valve groups and camshafts of modern engines, the lower portion of injector 28 is provided with the same thread and reach and body diameter dimensions of an ordinary spark plug in the portion 76 and 86 below voltage insulation well 66. Similarly small injector sections are provided for replacement of diesel fuel injectors all while incorporating the essential capabilities of precision spark ignition and stratified charge presentation of fuels that vary in properties from diesel fuel to hydrogen and/or hydrogen-characterized fuels.

The embodiment of FIG. 2 enables high voltage for spark ignition to be applied to conductor 68 within well 66 and thus development of ionizing voltage across conductive nozzle 70 and charge accumulation features 85 within threaded portion 86 at the interface to the combustion chamber as shown in FIGS. 2 and 3. Flow control valve 74 is lifted by high strength insulator cable or light conducting fiber cable 60, which is moved by force of armature 48 of solenoid operator assembly as shown. Light cable 60 is typically 0.04 mm (0.015 inch) in diameter and is preferably formed of a bundle of high strength light-pipe fibers including selections of fibers that effectively transmit radiation in the IR, visible and/or UV wavelengths.

This bundle is preferably sheathed in a protective shrink tube or assembled in a thermoplastic binder to form a very high-strength, flexible, and extremely insulative actuator for flow valve 74 and data gathering component that continually reports combustion chamber conditions in IR, visible, and/or UV light data. It is preferred to provide protective lens or coatings for cable 60 at combustion chamber interface 83 to provide combustion pressure data by a fiber-optic Fabry-Perot interferometer, or micro Fabry-Perot cavity based sensor, or side-polished optical fiber. Pressure data at the combustion chamber end of cable 60 is transmitted by the light-pipe bundle shown which is protected from abrasion and thermal degradation. Suitable lens protection materials include diamond, sapphire, quartz, silicon carbide, and other ceramics in addition to heat-resisting superalloys and kantholls.

In another embodiment shown in FIG. 4, injector 29 is provided with a transparent dielectric insulator 72 that provides light pipe transmission of radiation frequencies from the combustion chamber to optoelectronic sensor 62P along with the varying strain signal to stress sensor 62D corresponding to combustion chamber pressure conditions. Embedded computer 62 preferably receives signals from sensors 62O and 62P for production of analog or digitized fuel-delivery and spark-ignition events as a further improvement in efficiency, power production, operational smoothness, fail-safe provisions, and longevity of engine components. Computer 62 records sensor indications to determine the time between each cylinder's torque development to derive positive and negative engine acceleration as a function of adaptive fuel-injection and spark-ignition timing and flow data in order to determine adjustments needed for optimizing desired engine operation parameters. Computer 32 serves as the master computer to control the system of FIG. 1 including various selections of operations by injectors such as embodiments 28, 29 or 29' as shown in FIGS. 2, 3, 4, 5, 8, 9 and 11.

Figure 10:
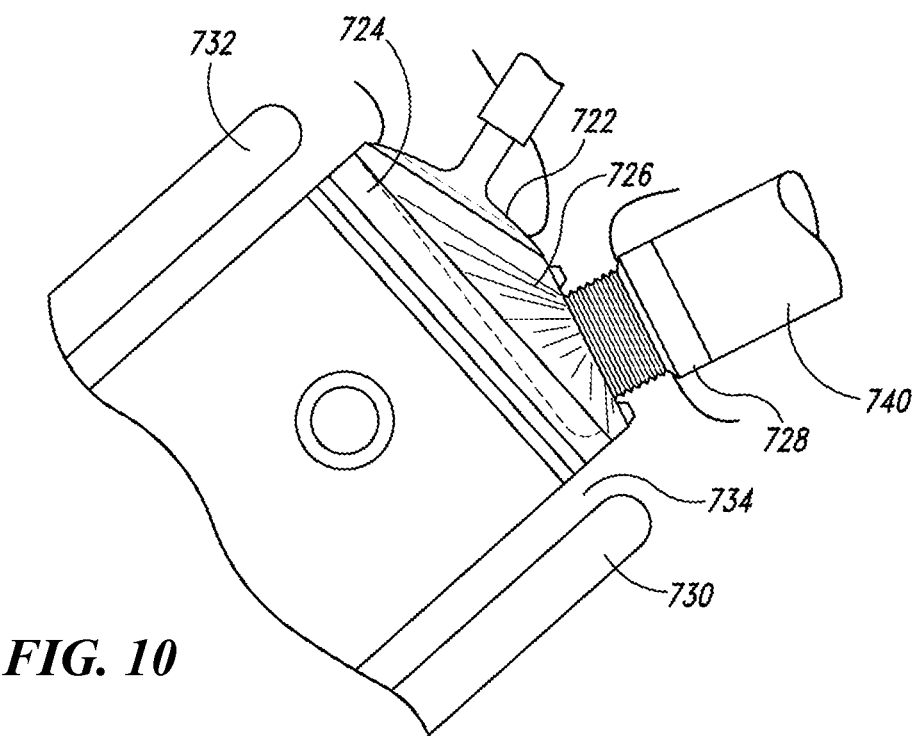
FIG. 10 is an illustration of embodiments of the invention that is operated in accordance with the principles of the invention.

Protection of fiber optic bundle 60 below valve 74 is provided by substantially transparent check valve 84 as shown in FIGS. 4 and 5. A particularly fast closing check valve 84 is comprised of a ferromagnetic element encapsulated within a transparent body. This combination of functions may be provided by various geometries including a ferromagnetic disk within a transparent disk or a ferromagnetic ball within a transparent ball as shown. Such geometries enable check valve 84 to be magnetically forced to the normally closed position to be very close to flow control valve 74 and the end of fiber optic bundle 60 as shown. When flow control valve 74 is lifted to provide fuel flow, check valve 84 is forced to the open position within the well bore that cages it within the intersecting slots 88 that allow fuel to flow through magnetic valve seat 90 past check valve 84 and through slot pattern 88 to present a very high surface to volume penetration of fuel into the air in the combustion chamber as shown in FIGS. 1 and 10. Fiber optic bundle 60 continues to monitor combustion chamber events by receiving and transmitting radiation frequencies that pass through transparent check valve 84. Suitable materials for transparent portions of check valve 84 include sapphire, quartz, high temperature polymers, and ceramics that are transparent to the monitoring frequencies of interest.

Generally it is desired to produce the greatest torque with the least fuel consumption. In areas such as congested city streets where oxides of nitrogen emissions are objectionable, adaptive fuel injection and ignition timing provides maximum torque without allowing peak combustion temperatures to reach 2,200° C. (4,000 OP). Determination of the peak combustion temperature is preferably provided by a flame temperature detector that utilizes a small diameter fiber optic cable 60 or larger transparent insulator 72. Insulator 72 may be manufactured with heat and abrasion resisting coatings such as sapphire or diamond-coating on the combustion chamber face of a high temperature polymer or from quartz, sapphire, or glass for combined functions within injector 28 including light-pipe transmission of radiation produced by combustion to a photoelectronic detector 62D of controller 62 as shown. Controllers 62, 43, and/or 32 monitor the signal from detector 62D in each combustion chamber to adaptively adjust fuel-injection and/or spark-ignition timing to prevent formation of nitrogen monoxide.

Thus virtually any distance from the interface to the combustion chamber to a location above the tightly spaced valves and valve operators of a modern engine can be provided by fuel control forces transmitted to normally closed valve 74 by insulative cable 60 along with integral spark ignition at the most optimum spark plug or diesel fuel injector location. This allows an injector to replace the spark plug or diesel fuel injector to provide precision fuel-injection timing and adaptive spark-ignition for high efficiency stratified charge combustion of a very wide variety of fuel selections including less expensive fuels regardless of octane, cetane, viscosity, temperature, or fuel energy density ratings. Engines that were previously limited in operation to fuels with specific octane or cetane ratings are transformed to more efficient longer lived operation by the present invention on fuels that cost less and are far more beneficial to the environment In addition, it is possible to operate injector 28, 29, or 29' as a pilot fuel delivery and ignition system or as a spark-only ignition system to return the engine to original operation on gasoline delivered by carburetion or intake manifold fuel injection systems. Similarly it is possible to configure injector 28, 29 or 29' for operation with diesel fuel or alternative spark-ignited fuels according to these various fuel metering and ignition combinations.

Figure 9:
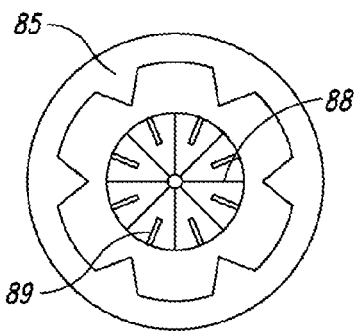
FIG. 9 is an end view of embodiments of the invention.

The invention provides the ability to avoid formation of oxides of nitrogen while adaptively controlling fuel-injection timing and spark-ignition timing for such purposes as maximizing fuel economy, specific power production, assuring lubricative film maintenance on combustion chamber cylinders, or minimization of noise. In many instances it is preferred to extend light pipe 60 fixedly through valve 74 to or near the combustion chamber face of fuel distribution nozzle to view combustion chamber events through the center of slots 88 as shown in FIGS. 3, 5 and 9. Radiation signal bundle 60 may also form one or more free motion flex loops above armature-stop ball 35, which preferably enables armature 48 to begin movement and develop momentum before starting to lift insulating fibers 60 to thus suddenly lift valve 74, and fixedly passes through 45 to deliver radiation wavelengths from the combustion chamber to sensor 40 as shown. Sensor 40 may be separate or integrated into controller 43 as shown. This Optoelectronic sensor system provides comprehensive monitoring of combustion chamber conditions including combustion, expansion, exhaust, intake, fuel injection and ignition events as a function of pressure and/or radiation detection in the combustion chamber of engine 30 as shown. Thus the temperature and corresponding pressure signals from sensor 40 and or 62D and/or 62P enables controller 32 to instantly correlate the temperature and time at temperature as fuel is combusted with the combustion chamber pressure, piston position, and with the chemical nature of the products of combustion.

Such correlation is readily accomplished by operating engine 30 with combined data collection of piston position, combustion chamber pressure by the technology disclosed in my U.S. Pat. Nos. 6,015,065; 6,446,597; 6,503,584, 5,343, 699; and 5,394,852 along with co-pending application 60/551,219 and combustion chamber radiation data as provided by light pipe assembly 60 to sensor 40 as shown. Correlation functions that are produced thus enable the radiation signal delivered by light bundle 60 to sensor 40 and piston position data to indicate the combustion chamber pressure conditions as needed to adaptively optimize various engine functions such as maximization of fuel economy, power production, avoidance of oxides of nitrogen, etc. Thereafter the data provided by light pipe 60 and sensor 40 to computer 43 enables extremely rapid and adaptive control of the engine functions with a very inexpensive injector.

A more comprehensively adaptive injection system can incorporate both the radiation sensor system 40 and 60 along with one or more pressure sensors as disclosed in my previously referenced patents and co-pending applications which are included herein by reference. In such instances it is preferred to monitor rotational acceleration of the engine for adaptive improvement of fuel economy and power production management. Engine acceleration may be monitored by numerous techniques including crankshaft or camshaft timing, distributor timing, gear tooth timing, or piston speed detection. Engine acceleration as a function of controlled variables including fuel species selection, fuel species temperature, fuel injection timing, injection pressure, injection repetition rate, ignition timing and combustion chamber temperature enable remarkable improvements with conventional or less-expensive fuels in engine performance, fuel economy, emissions control, and engine life.

Development of spark plasma ignition with adaptive timing to optimize combustion of widely varying fuel viscosities, heating values, and vapor pressures is provided by this new combination of remote valve operator 48 and flow control valve 74 essentially at the combustion chamber and virtually eliminates harmful before or after dribble because there is little or no clearance volume between flow control valve 74 and the combustion chamber. Fuel flow impedance ordinarily caused by channels that circuitously deliver fuel is avoided by locating the flow control valve 74 virtually at the combustion chamber. Flow control valve 74 can be urged to the normally closed condition by a suitable mechanical spring or by compressive force on cable or rod 60 as a function of force applied by spring 36 or by magnetic spring attraction to valve seat 90 including combinations of such closing actions.

Very important pressure-tolerant performance is achieved by providing free acceleration of armature driver 48 followed by impact on ball 35, which is fixed on cable or rod 60 at a location, designed to suddenly lift or displace ball 74. Driver 48 moves relatively freely toward the electromagnetic pole piece and past stationery dielectric fiber cable 60 as shown. After considerable momentum has been gained, driver 48 strikes ball 35 within the spring well shown. Ball 35 is attached to dielectric fiber cable 60 within spring 35 as shown. Thus sudden application of much larger force by this impact than could be developed by a direct acting solenoid valve causes relatively smaller inertia normally closed valve component 74 to suddenly lift from the upper valve seat of the passageway in component 90.

This embodiment may utilize any suitable seat for valve element 74, however for applications with combustion chambers of small engines it is preferred to incorporate a permanent magnet within or as seat 90 to urge flow control valve element 74 to the normally closed condition as shown. Such sudden impact actuation of 74 by 48 enables assured precision flow of fuel regardless of fuel temperature, viscosity, presence of slush crystals, or the applied pressure that may be necessary to assure desired fuel delivery rates. Permanent magnets such as SmCo and NdFeB readily provide the desired magnetic forces at operating temperatures up to 205° C. (401° F.) and assures that ferromagnetic valve 74 is urged to the normally closed position on magnetic seat 90 to thus virtually eliminate clearance volume and after dribble. Thus the flow of relatively cool fuel as achieved by the embodiments of FIG. 1 assures the heat transfer required for thermal stability of closure springs or permanent magnet seat 90 in such applications.

In illustrative comparison, if the flow control valve would be incorporated with armature 48 for delivery within the bore of an insulator 64 to conductive nozzle 70, after dribble of fuel that temporarily rested in the clearance volume shown could be as much in volume as the intended fuel delivery at the desired time in the engine cycle. Such flow of after dribble could be during the last stages of expansion or during the exhaust stroke and therefore would be mostly if not completely wasted while causing flame impingement loss of protective cylinder wall lubrication, needless piston heating and increased friction due to differential expansion, and overheating of exhaust system components. This is an extremely important invention for enabling interchangeable utilization of conventional or lower-cost fuels to be utilized regardless of octane rating, vapor pressure or specific fuel energy per volume.

Further, conventional valve operation systems would be limited to pressure drops of about 7 atmospheres compared to more than 700 atmospheres as provided by the sudden impact of driver 48 on cable rod 60 and thus on valve 74. Cryogenic slush fuels with prohibitively difficult textures and viscosities comparable to applesauce or cottage cheese are readily delivered through relatively large passageways to normally closed valve 74, which rests upon the large diameter orifice in seat 90. Rapid acceleration then sudden impact of large inertia electro-magnet armature 48 transfers a very large lifting force through dielectric cable 60 to suddenly and assuredly lift valve 74 off the large orifice in seat 90 to open normally-closed check valve 84, if present, and jet the fuel slush mixture into the combustion chamber. The same assured delivery if provided without after dribble for fuels in any phase or mixtures of phases including hydrogen and other very low viscosity fuels at temperatures of 400° F. (204° C.) or higher as may be intermittently provided.

Thus regardless if the fuel density is that of liquid gasoline or cryogenic hydrogen at cold engine startup and then becomes hundreds or thousands of times less dense as the engine warms up to provide heat for conversion of liquid fuels to gaseous fuels, precision metering and ignition of fuel entering the combustion chamber is provided without adverse after dribble. This allows a vehicle operator to select the most desirable and available fuel for re-filling tank 4. Thereafter engine exhaust heat is recovered by heat exchanger(s) shown in FIG. 1 and SparkInjector embodiment 28 provides the most desirable optimization of the fuel selected by utilization of engine waste heat to provide the advantages of hydrogen-characterized stratified-charge combustion. In very cold climates and to minimize carbon dioxide emissions it is preferred to transfer and store hydrogen or hydrogen-characterized gases in accumulator 19 by transfer through solenoid valve 27 at times that plentiful engine heat is available to reactor 236. At the time of cold engine startup, valve 27 is opened and hydrogen or hydrogen-characterized fuel flows through valve 27 to pressure regulator 21 and to SparkInjector(s) 28 to provide an extremely fast, very high efficiency, and clean startup of engine 30.

Figure 6A:
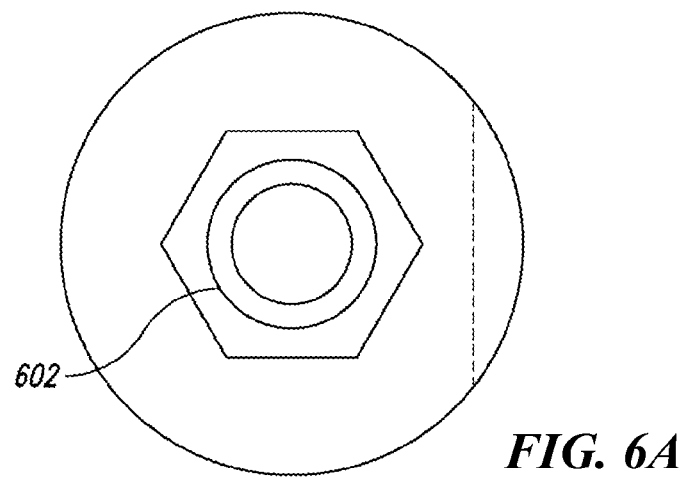
FIG. 6 is an embodiment of the invention and FIG. 6 A is another view of this embodiment.
Figure 6B:
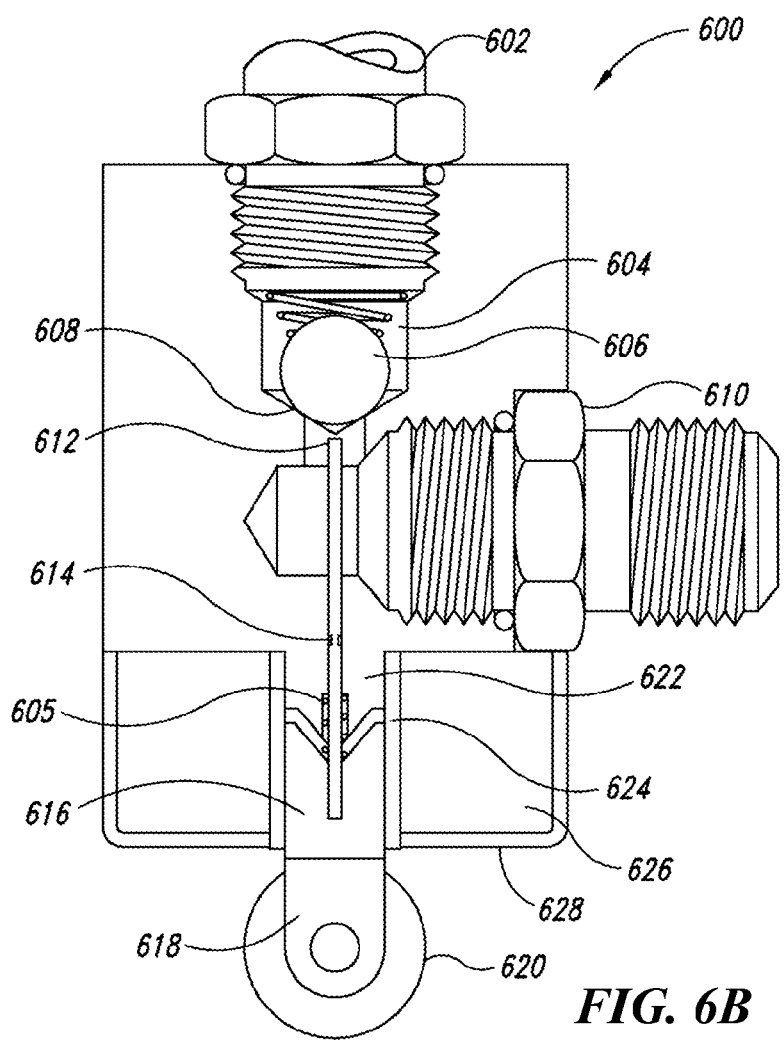

Providing the opportunity to utilize renewable fuels and improving the efficiency and longevity of large engines in marine, farming, mining, construction and heavy hauling by rail and truck applications is essential, but it is extremely difficult to deliver sufficient gaseous fuel energy in large engines that were originally designed for diesel fuel. FIG. 6 shows a partial section of a unit valve 600 for enabling controlled deliveries of pressurized supplies of large volumes of relatively low energy density fuels to each cylinder of an engine such as 30. Valve 600 is particularly beneficial for enabling very low energy density fuels to be utilized in large engines in conjunction with a SparkInjector as substantially stratified-charge combustants at higher thermal efficiencies than conventional fuels. Unit valve 600 also enables such fuels to be partially utilized to greatly improve the volumetric efficiency of converted engines by increasing the amount of air that is induced into the combustion chamber during each intake cycle.

Pressurized fuel is supplied through inlet fitting 602 to the ball chamber shown where spring 604 urges ball 606 the closed position on seat 608 as shown. In high-speed engine applications or where spring 604 is objectionable because solids in slush fuels tend to build up it is preferred to provide seat 608 as a pole of a permanent magnet to assist in rapid closure of ball 606. At times that fuel delivery to a combustion chamber is desired, push-rod 612 forces ball 606 to lift off of seat 608 and fuel flows around ball 606 and through the passageway shown to fitting 610 for delivery to the combustion chamber. Push rod 612 is sealed by closely fitting within the bore shown in 622 or by an elastomeric seal such as an O-ring 614. Actuation of push rod 612 can be by any suitable method or combination of methods.

Suitable control of fuel flow can be provided by solenoid action resulting from the passage of an electrical current through an annular winding 626 within steel cap 628 in which the solenoid plunger 616 axially moves with connection to push rod 612 as shown. Plunger 616 is preferably a ferromagnetic material that is magnetically soft. Plunger 616 is guided in linear motion by sleeve bearing 624 which is preferably a self-lubricating, or low friction alloy such as a Nitronic alloy, or permanently lubricated powder-metallurgy oil-impregnated bearing that is threaded, interference fit, locked in place with a suitable adhesive, swaged, or braised to be permanently located on ferromagnetic pole piece 622 of valve 600 as shown.

Ball 606 may also be opened by impulse action in which plunger 616 is allowed to gain considerable momentum before providing considerably higher opening force after it is allowed to move freely prior to suddenly causing pin 612 to strike ball 606. In this instance it is preferred to provide sufficient "at rest" clearance between ball 606 and the end of push rod 612 when plunger 616 is in the neutral position at the start of acceleration towards ball 606 to allow considerable momentum to be developed before ball 606 is suddenly impacted.

An alternative and/or auxiliary method for intermittent operation of push rod 612 and thus ball valve 606 is by rotary solenoid or mechanically driven cam displacement that operates at the same frequency that controls the air inlet valve(s) and/or the power stroke of the engine. Such mechanical actuation can be utilized as the sole source of displacement for ball 606 or in conjunction with a push-pull or rotary solenoid. In operation, a clevis 618 holds ball bearing assembly 620 in which a roller or the outer race of an antifriction bearing assembly rotates over a suitable cam to cause linear motion of plunger 616 and push rod 612 toward ball 606. After striking ball 606 for development of fuel flow as desired, ball 606 and plunger 616 is returned to the neutral position by the magnetic seat and/or springs 604 and 605 as shown.

Figure 7:
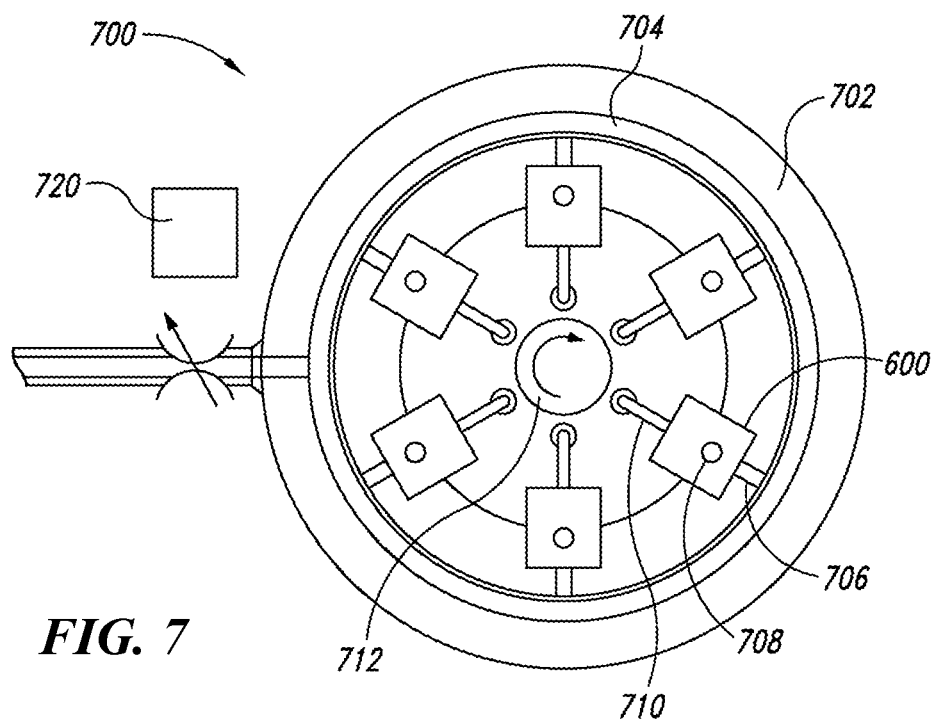
FIG. 7 is an embodiment of the invention.

It is similarly contemplated that suitable operation of unit valve 600 may be by cam displacement of 620 with "hold-open" functions by a piezoelectric operated brake (not shown) that is applied to plunger 616 to continue the fuel flow period after passage of the cam lobe of 712 as shown in FIGS. 6 and 7. This provides fluid flow valve functions in which a moveable valve element such as 606 is displaced by plunger 612 that is forced by suitable mechanisms including a solenoid, a cam operator, and a combination of solenoid and cam operators in which said valve element 606 is occasionally held in position for allowing fluid flow by such solenoid, a piezoelectric brake, and/or a combination of solenoid and piezoelectric mechanisms.

Fuel flow from unit valve 600 may be delivered to the engine's intake valve port, to a suitable direct cylinder fuel injector, and/or delivered to an injector having selected combinations of the embodiments shown in greater detail in FIGS. 2, 3, 4, 5, 8 and 9. In some applications such as large displacement engines it is desirable to deliver fuel to all three entry points. In instances that pressurized fuel is delivered by timed injection to the inlet valve port of the combustion chamber during the time that the intake port or valve is open, increased air intake and volumetric efficiency is achieved by imparting fuel momentum to cause air-pumping for developing greater air density in the combustion chamber.

In such instances the fuel is delivered at a velocity that considerably exceeds the air velocity to thus induce acceleration of air into the combustion chamber. This advantage can be compounded by controlling the amount of fuel that enters the combustion chamber to be less than would initiate or sustain combustion by spark ignition. Such lean fuel-air mixtures however can readily be ignited by fuel injection and ignition by the injector embodiments of FIGS. 2, 3, 4, 5, 8, and 9, which) provides for assured ignition and rapid penetration by combusting fuel into the lean fuel-air mixture developed by timed port fuel injection.

Additional power may be provided by direct cylinder injection through a separate direct fuel injector that adds fuel to the combustion initiated by the injector. Direct injection from one or more separate direct cylinder injectors into combustion initiated by an injector assures rapid and complete combustion within excess air and avoids the heat loss usually associated with separate direct injection and spark ignition components that require the fuel to swirl, ricocheting and/or rebounding from combustion chamber surfaces and then to combust on or near surfaces around the spark ignition source.

In larger engine applications, for high speed engine operation, and in instances that it is desired to minimize electrical current requirements and heat generation in solenoid 626 it is particularly desirable to combine mechanical cam actuated motion with solenoid operation of plunger assembly 616 and 612. This enables the primary motion of plunger 616 to be provided by a shaft cam such as 712 of FIG. 7. After the initial valve action of ball 606 is established by cam action for fuel delivery adequate for idle operation of the engine, increased fuel delivery and power production is provided by increasing the "hold-on time" by continuing to hold plunger against stop 622 as a result of creating a relatively small current flow in annular solenoid winding 626. Thus assured valve operation and precise control of increased power is provided by prolonging the hold-on time of plunger 616 by solenoid action following quick opening of ball 606 by cam action as shown in FIGS. 6, 7 and 10.

Engines with multiple combustion chambers are provided with precisely timed delivery of fuel by the arrangement unit valves of embodiment 700 as shown in the schematic fuel control circuit layout of FIG. 7. In this illustrative instance, six unit valves (600) are located at equal angular spacing within housing 702. Housing 702 provides pressurized fuel to each unit valve inlet 706 through manifold 704. The cam shown on rotating camshaft 712 intermittently actuates each push rod assembly 710 to provide for precise flow of fuel from inlet 706 to outlet 708 which delivers to the desired intake valve port and/or combustion chamber directly or through a SparkInjector as shown in FIGS. 6, 7, and 10. Housing 702 is preferably adaptively adjusted with respect to angular position relative to cam 712 to provide spark and injection advance in response to adaptive optimization algorithms provided by controller 720 as shown.

Controller 720 and/or 32 preferably provides adaptive optimization of each combustion chamber's fuel-delivery and spark-ignition events as a further improvement in efficiency, power production, operational smoothness, fail-safe provisions, and longevity of engine components. Controller 720 and/or 32 records sensor indications to determine the time between each cylinder's torque development to derive positive and negative engine acceleration as a function of adaptive fuel-injection and spark-ignition data in order to determine adjustments needed for optimizing desired engine operation outcomes.

Generally it is desired to produce the greatest torque with the least fuel consumption. However, in areas such as congested city streets where oxides of nitrogen emissions are objectionable, adaptive fuel injection and ignition timing provides maximum torque without allowing peak combustion temperatures to reach 2,200° C. (4,000° F.). This is achieved by the invention embodiments shown.

Determination of the peak combustion temperature is preferably provided by a flame temperature detector that utilizes a small diameter fiber optic cable or larger transparent insulator 72 as shown. Insulator 72 may be manufactured with heat and abrasion resisting coatings such as sapphire or diamond-coating on the combustion chamber face of a high temperature polymer or from quartz, sapphire, or glass for combined functions within the injector including light-pipe transmission of radiation produced by combustion to a photoelectronic detector 62D of controllers 32, 43, and/or 62 as shown. Controller 72O monitors the signal from detector 62D in each combustion chamber to adaptively adjust fuel-injection and/or spark-ignition timing to prevent formation of nitrogen monoxide or other oxides of nitrogen.

It is preferred to provide a cast or to injection mold polymer insulation through a hole provided through light pipe 72 for high-voltage lead 68 that protects and seals lead 68, nozzle 70, and controller 62 and forms insulating well 66 as shown. It is also preferred to use this same insulator to form another insulator well 66 similar to 50 in a location adjacent to but below and rotated from well 50 for protecting electrical connections to controller 62.

Figure 8:
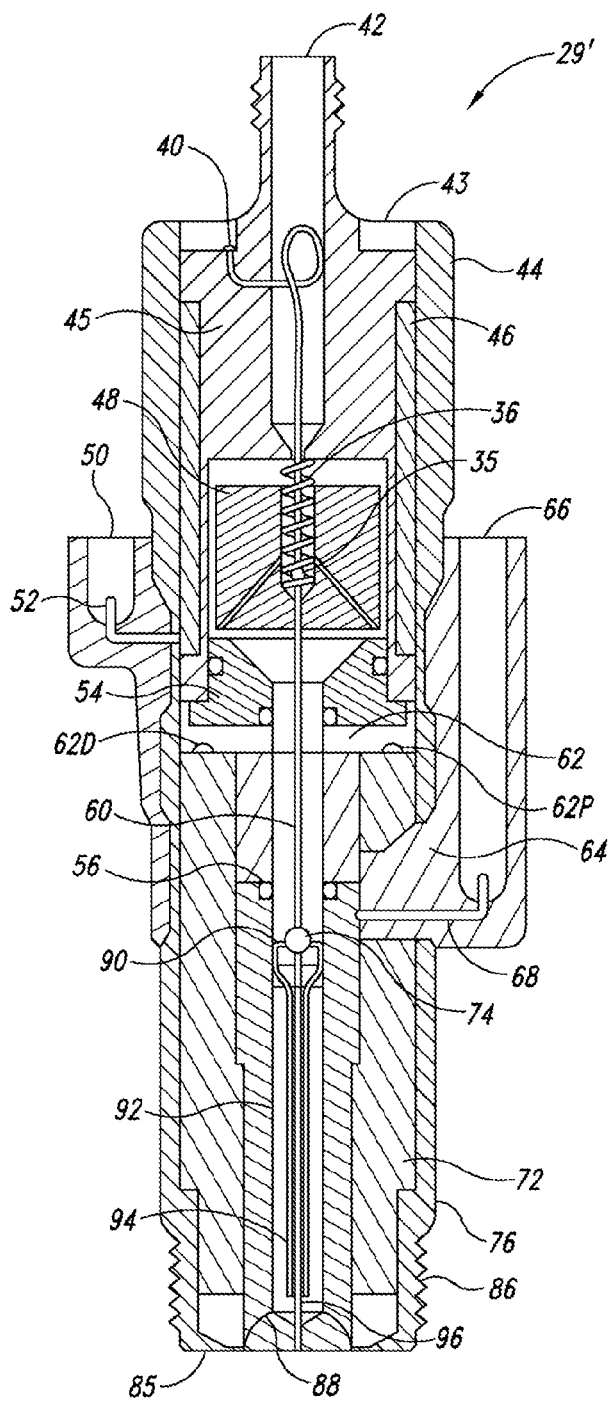
FIG. 8 is another embodiment of the invention.

In high-speed engines and in single rotor or single cylinder applications it is preferred to utilize solid-state controller 62 as shown in FIG. 8 to provide optical monitoring of combustion chamber events. It is also preferred to incorporate one or more pressure sensor(s) 62P in the face of controller 62 in a position similar to or adjacent to 62D for generation of a signal proportional to the combustion chamber pressure. Pressure sensor 62P monitors and compares intake, compression, power and exhaust events in the combustion chamber and provides a comparative basis for adaptive control of fuel-injection and ignition timing as shown.

One of many options for providing fuel metering and ignition management is to provide the "time-on" duration by cam action 712 shown in FIG. 7 for idle operation of the engine. Cam location can be remote from valve component 606 through the utilization of a push-rod such as 612 and/or by a rocker arm for further adaptation as needed to meet retrofit applications along with the special geometries of new engine designs. Increased engine speed and power production is provided by increasing the "hold-on" time of plunger 616, push-rod 612 and ball 606 by passage of a low power current through annular solenoid winding 626 for an increased fuel delivery time period after initial passage of rotating cam 712. This provides a combined mechanical and electromechanical system to produce the full range of desired engine speed and power.

Ignition may be triggered by numerous initiators including Hall effect, piezoelectric crystal deformation, photo-optic, magnetic reluctance, or other proximity sensors that detect cam 712 or other synchronous events such as counting gear teeth or by utilizing an optical, magnetic, capacitive, inductive, magneto-generator, or some other electrical signal change produced when plunger 616 moves within bushing 624 and winding 626. After this plunger motion signal is produced it is preferred to utilize electronic computer or a separate engine computer such as 720 or 62 to provide adaptive fuel injection and spark timing to optimize one or more desired results selected from increased power production, increased fuel economy, reduced nitrogen monoxide formation, and to facilitate engine starting with least starter energy or to reverse the engine's direction of rotation to eliminate the need for a reverse gear in the transmission.

The present invention overcomes the problem of fuel waste that occurs when the valve that controls fuel metering is at some distance from the combustion chamber. This problem allows fuel to continue to flow after the control valve closes and results in the delivery of fuel when it cannot be burned at the optimum time interval to be most beneficial in the power stroke. It is particularly wasteful and causes engine and exhaust system degradation if such fuel continues to be dribbled wastefully during the exhaust stroke. In order to overcome this difficult problem of delivering sufficient volumes of gaseous fuel without dribble and after-flow at times the fuel could not be optimally utilized, it is preferred to utilize embodiment 28, 29 or 29' as the final delivery point to convey fuel quickly and precisely into the combustion chambers of internal combustion engines that power the system of FIG. 1 and/or on-site engines or transportation applications that receive fuel delivered by the invention.

Fuel to be combusted is delivered to a injector 29' as shown in FIG. 8 by suitable pressure fitting through inlet 42. At times that it is desired to deliver fuel to the combustion chamber of a converted Diesel or spark-ignited engine, solenoid operator assembly 43, 44, 46, 48, and 54 is used. Ferromagnetic driver 48 moves in response to electromagnetic force developed when voltage applied on lead 52 within insulator well 50 causes electrical current in annular windings of insulated conductor 46 and driver 48 moves toward the solenoid core pole piece 45 as shown.

Driver 48 moves relatively freely toward the electromagnetic pole piece as shown past momentarily stationery dielectric fiber cable 60. After considerable momentum has been gained, driver 48 it strikes ball 35 within the spring well shown. Ball 35 is attached to and mechanically terminates dielectric fiber cable 60 within spring 35 as shown. This sudden application of much larger force by momentum transfer than could be developed by a direct acting solenoid valve causes relatively smaller inertia normally-closed valve component 74 to suddenly lift from the upper valve seat of the passage way in component 90 as shown.

In another embodiment of the multifuel SparkInjector 29' a selected fuel is delivered at desired times for fuel injection to flat spring tube 94 which is normally flat and that is inflated by fuel that enters it to provide a rounded tube for very low impedance flow into the combustion chamber as shown in FIGS. 8 and 9. After completion of such forward fuel flow into the combustion chamber, flat spring tubing 94 collapses to the essentially "zero clearance volume" closed position to serve effectively as a check valve against flow of pressurized gases from the combustion chamber. Fiber optic bundle 60 is extended through flow control valve 74 below magnetic seat 90 to view the combustion chamber events by passing through flat tube 94 to the central convergence of slots 88 as shown or in the alternative through a central hole of a family of holes provided at desired angles that would serve as well for distributing fuel to produce desired stratified charge combustion (this alternative view is not specifically illustrated).

Figure 11:
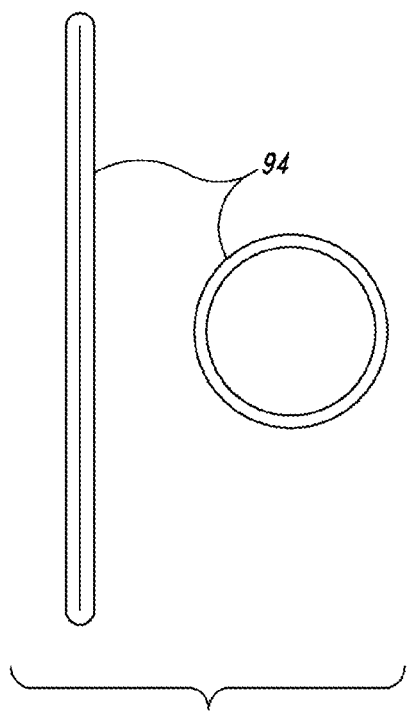
FIG. 11 illustrates an embodiment of the invention that is operated in accordance with the principles of the invention.

FIG. 8 shows the flattened cross-section of flat spring tube 94 between fuel injection events to effectively present a check valve against flow of combustion chamber gases between fuel injection events. FIG. 11 shows the magnified views of flattened and fuel-inflated rounded tube cross-sections that alternately serve as a normally closed check valve and a free flow channel for delivery of fuel to the combustion chamber. Suitable elastomers that serve well as a material selection for flat spring tube 94 include PTFE, ETFE, PFA, PEEK, and FEP for a broad range of working temperatures from −251 to 215° C.

(−420 to +420° F.). It is intended that such flat/round tubes elastically inflate to more or less the limits of passage 92 as fuel is transmitted and contract and conform to the space available for flattened material between fuel delivery intervals. Thus the flattened shape shown in FIG. 11 may assume crescent, twisted, curved and/or corrugated to comply with the dimensions and geometry of passage 92. Synergistic benefits include cooling of tube 94 by fuel passage from heat exchanges through 26 and/or 23 as shown in FIG. 1 to assure long life of spring tube 94.

As flat spring tube 94 collapses following fuel delivery bursts, combustion gases pass inwards through slots 88 and 89 to fill the space left between bore 92 of nozzle 72 and the flattened tube. In adiabatic engine applications and very high performance engines this provides heat transfer to the flat tube and thus to the fuel that is cyclically passed through the flat tube. For such purposes it is particularly advantageous to warm deliveries of dense cool or super cold fuel. This unique arrangement also provides cooling of the upper regions of the injector assembly followed by heat transfer to the fuel for increasing the vapor pressure and/or energizing phase changes just prior to injection and ignition in the combustion chamber. Thus spring tube 94 can further serve as a cyclic heat exchanger for beneficial operation with a widely varying fuel selections and conditions as shown.

In instances that it is necessary to provide cold start and operation on low vapor pressure liquids such as methanol, ethanol, diesel fuel or gasoline injector 28 or 29 provides for very fast repeated open-and-close cycles of flow control valve 74 to provide a new type of fuel delivery with exceptionally high surface to volume characteristics. By operating the flow control valve at duty cycles such as 0.0002 seconds open and 0.0001 seconds closed which is achieved by the impact opening action of armature 48 on very low inertia cable or rod 60 and ball 74, fuel is injected as a series of rarified and denser patterned waves from slots 88 as shown in FIGS. 2 and 3. This provides assured spark ignition followed by superior rates of combustion of the thin, high-surface-to volume fuel films that result during total overall injection periods of about 0.001 seconds at idle to about 0.012 seconds during acceleration of engine 30. Such patterned flat film waves of injected fuel from slots 88 enable considerably later injection and assured ignition than possible with conventional approaches to produce homogeneous-charge air-fuel mixtures or compromised stratified charge air fuel mixtures by rebounds or ricochets from combustion chamber surfaces as necessitated by a separate fuel injector and spark plug combination.

By adaptive timing of spark ignition with each wave of injected fuel, much greater control of peak combustion temperature is provided. This enables initially fuel-rich combustion to kindle the fuel film followed by transition by the expanding flame front into excess air that surrounds the stratified charge combustion to produce far air-rich combustion to assure complete combustion without exceeding the peak combustion temperature of 2,204° C. (4,000° F.) to thus avoid oxides of nitrogen formation.

The combination of embodiments disclosed provide a methodology and assured process for energy conversion comprising the steps of storing one or more fuel substances in a vessel, transferring such fuel and/or thermal, thermochemical, or electrochemical derivatives of such fuel to a device that substantially separates the valve operator such as 48 from the flow control valve component 74 at the interface of a combustion chamber of an engine to control such fuel or derivatives of such fuel by an electrically insulating cable to substantially eliminate fuel dribble at unintended times into the engine's combustion chamber. This combination enables efficient utilization of virtually any gaseous, vaporous, liquid, or slush fuel regardless of fuel energy density, viscosity, octane or cetane number. Development of sufficient voltage potential on or through valve 74 at the combustion chamber provides plasma or spark ignition of entering fuel at adaptively precise times to optimize engine operations.

This multifuel injection and ignition system for energy conversion is applicable to mobile and stationary engine operations. Hybrid vehicles and distributed energy applications are particularly worthy examples of such applications. In instances that maximum power from engine 30 is desired it is preferred to use hydrogen, if available from tank 4, or hydrogen-characterized fuel produced by embodiment 236 which is then cooled by embodiment 26 and/or by mixing with cooler feedstock from tank 4 and to provide stratified charge injection during the compression stroke in engine 30 to cool the unthrottled air charge to reduce backwork due to compression work followed by adaptive spark ignition timing to quickly combust the hydrogen or hydrogen-characterized fuel to maximize brake mean effective pressure (BMEP).

In instances that minimization of oxides of nitrogen are desired it is preferred to use hydrogen or hydrogen-characterized fuel and adaptively adjust injection timing and ignition timing to produce the highest BMEP without exceeding the peak combustion chamber temperature of 2,204° C. (4,000° F.). In instances that it is desired to produce the quietest operation it is preferred to monitor operational noise at one or more acoustic sensors such as 17, near the exhaust manifold, and 13, near the exhaust pipe and to adaptively adjust fuel injection timing and ignition timing for minimum noise in the acoustical wavelengths heard by humans. In instances that it is desired to produce maximum engine life it is preferred to adaptively adjust fuel injection timing and ignition timing to produce the highest BMEP with the least amount of heat transfer to combustion chamber surfaces.

In instances that it is desired to maximize production of oxides of nitrogen for medical, industrial, chemical synthesis, and agricultural applications, it is preferred to maximize stratified charge combustion temperatures and to operate at high piston speeds to quickly produce and quench oxides of nitrogen that are formed in the combustion chamber. This enables combined production of desired chemical species while efficiently producing motive power for electrical generation, propulsion, and/or other shaft power applications. The system that combines operation as disclosed with respect to FIGS. 1, 2, 4, 6, 7, 8, and 10 is particularly effective in providing these novel developments and benefits.

It is preferred to utilize hydrogen from accumulator 19 as provided by regulator 21 or a similar regulator to supply processed fuel as a cover gas for rotating equipment such electricity generators and engine 31 for the purpose of removing heat generated by the rotating equipment and for reducing windage and friction losses. It has been found that the purity of such hydrogen is not critical and significant amounts of methane, carbon monoxide etc., may be present without harm to the rotating equipment and that very substantial improvements in efficiency and energy conversion capacity are provided by such use. Thus virtually any primary fuel that contains hydrogen or reacts with a compound that contains hydrogen such as water to produce hydrogen can be converted by the embodiments of this invention for hydrogen cooling and reduction of windage losses of generators and improved efficiency and greater safety of internal combustion engines. Embodiments of FIG. 1 along with 28, 29, 600, 700, and 29' enable the low energy density hydrogen to be utilized as superior heat transfer agent and as a preferred fuel for fuel cell 37 and engine 30.

A particularly important application is to utilize such hydrogen for reducing the operating temperature in the windings of rotating electricity generators to enable more efficient operation and greater energy conversion capacity. After being warmed by passage through such rotating equipment hydrogen can then be routed to the crankcase of a piston engine and then to the injectors and/or valve assembly 700 of such engines to be utilized as fuel in the engine. This improves the efficiency of co-generation applications and increases the capacity of the resulting system. Filling the crankcase 55 of a piston engine with a hydrogen atmosphere improves operational safety by assuring that there cannot be a combustible mixture of air and hydrogen in the crankcase to support inadvertent ignition. This lower viscosity atmosphere synergistically reduces the windage and friction losses from the relative motion components of the engine. It also greatly improves the life of lubricating oil by elimination of adverse oxidizing reactions between oxygen and oil films and droplets that are produced in the crankcase. By maintenance of dry hydrogen atmosphere in the crankcase above the vaporization temperature of water, the further benefit of water removal and avoidance of corrosion of bearings and ring seals etc., due to the presence of electrolytic water is achieved.

Such moisturization of hydrogen in conjunction with crankcase-sourced water removal is highly advantageous for maintenance of the proton exchange membrane (PEM) in fuel cells such as 37 particularly in hybridized applications. This enables extremely flexible and efficient operation of systems based on the embodiments of FIG. 1 that range in demand from a few kilowatts output by fuel cell 37 to megawatts capacity by combining the engine-generator indicated with such fuel cell operation to meet changing demands due to daily variations, seasonal weather induced needs or production requirements.

FIGS. 12A, 12B, 12C, and 12D sequentially illustrate the stratified charge combustion results by a valve actuation operator such as generally disclosed regarding piezoelectric or electromagnetic armature 48 within the upper portion of injector 28 and which is electrically separated from but mechanically linked with the flow control valve 84, which is located at the interface to the combustion chamber as shown. In this instance, flow control component 84 serves as the moveable flow control valve that is displaced toward the combustion chamber to admit injected fuel and is moved upward to the normally-closed position to serve as a check valve against combustion gas pressure. Ignition of injected fuel occurs as plasma discharge is developed by the voltage potential applied between the threaded ground to the engine head or block and the insulated flow control valve assembly of component 84 as shown.

It thus will be understood that the objects of my invention have been fully and effectively accomplished and the invention includes all modifications encompassed within the spirit and scope of the following claims and their legal equivalence, rather than by the examples given. REQUEST UNDER MPEP 707.07(j): The undersigned a pro-se Inventor-Applicant respectfully requests that the Examiner find the patentable subject matter disclosed in this invention and if Examiner feels that the Applicant's present claims are not entirely suitable that the Examiner draft allowable claims for consideration by the Applicant.

What is claimed is:

1. An injector comprising:
   a body having an end portion configured to be positioned proximate to a combustion chamber;
   a valve assembly carried in the body, the valve assembly comprising—
   a first valve movable from a closed position to an open position to allow fuel to flow through at least a portion of the body; and
   a second valve elastically expandable from a closed configuration to an open configuration to dispense fuel from the end portion of the body; and
   an actuation assembly carried by the body and including a cable connected to the first valve to move the first valve between the closed and open positions.

2. The injector of claim 1 wherein the second valve expands from the closed configuration to the open configuration in response to fuel entering an opening of the second valve.

3. The injector of claim 2 wherein the first valve is positioned adjacent to the opening of the second valve when the first valve is in the closed position.

4. The injector of claim 1 wherein:
   the first valve is mechanically movable from the closed position to the open position via the actuation assembly; and
   the second valve is hydraulically expandable from the closed configuration to the open configuration via an increase in fuel pressure.

5. The injector of claim 1 wherein the first valve moves in a direction away from the second valve when the first valve moves from the closed position to the open position.

6. The injector of claim 1 wherein the second valve comprises at least one of the following materials: PTFE, ETFE, PFA, PEEK, and FEP.

7. The injector of claim 1 wherein the second valve comprises a spring tube.

8. The injector of claim 1 wherein the second valve has a generally flat cross-sectional shape in the closed configuration and a generally round cross-sectional shape in the open configuration.

9. The injector of claim 1 wherein the valve assembly further comprises a valve seat configured to contact at least a portion of the first valve when the first valve is in the closed position, wherein at least a portion of the valve seat is magnetic to at least partially retain the first valve in the closed position.

10. An injector comprising:
    an injector body having a longitudinal axis extending between a first end portion and a second end portion, wherein the second end portion is configured to be positioned near or at an interface with a combustion chamber;
    a first valve carried by the body and movable from a closed position to an open position along a path generally parallel to the longitudinal axis of the body;
    a second valve carried by the body and deformable from a closed configuration to an open position in a direction generally perpendicular to the longitudinal axis; and
    an actuation assembly carried by the body and operably coupled to the first valve to move the first valve from the closed position to the open position;
    wherein the actuation assembly comprises:
    a driver movably positioned in the body; and
    a cable operably coupled to the driver and the first valve, wherein the cable moves the first valve between the open and closed positions in response to movement of the driver.

11. The injector of claim 10 wherein the second valve is positioned downstream from and adjacent to the first valve.

12. The injector of claim 10 wherein the second valve expands from the closed configuration to the open configuration in response to fuel flowing past the first valve.

13. The injector of claim 10 wherein the second valve comprises a spring tube having an opening that contacts the first valve when the first valve is in the closed position.

14. The injector of claim 10 wherein the second valve is at least partially composed of an elastomeric material.

15. An injector comprising:
- an injector body having an end portion configured to be positioned near or at an interface with a combustion chamber;
- a flow valve carried by the body and movable from a closed position to an open position;
- an elastomeric pressure valve carried by the body and expandable from a closed configuration to an open position to dispense fuel from the end portion; and
- cable means for actuating the flow valve from the closed position to the open position.

16. The injector of claim 15 wherein the elastomeric pressure valve at least partially deforms radially outwardly when the elastomeric pressure valve expands from the closed configuration to the open configuration.

17. The injector of claim 15 flow valve is independently movable from the elastomeric pressure valve.

18. The injector of claim 15 wherein the pressure valve is positioned downstream from the flow valve in the body, and wherein the flow valve expands from the closed configuration to the open configuration in response to fuel flow past the flow valve.

19. The injector of claim 15 wherein the pressure valve comprises a spring tube, and wherein at least a portion of the spring tube has a generally flat shape in the closed configuration and a generally cylindrical shape in the open configuration.

* * * * *